(12) United States Patent
Leger et al.

(10) Patent No.: US 10,734,661 B2
(45) Date of Patent: Aug. 4, 2020

(54) FUEL CELL COMPONENTS, STACKS AND MODULAR FUEL CELL SYSTEMS

(71) Applicant: Loop Energy Inc., Vancouver (CA)

(72) Inventors: David E. Leger, Chilliwack (CA); Matthew P. Paone, Burnaby (CA); Greg J. Montie, Surrey (CA); Sean MacKinnon, Vancouver (CA); Raoul Kingma, Langley (CA)

(73) Assignee: LOOP ENERGY INC., Vancouver (CA)

(*) Notice: Subject to any disclaimer, the term of this patent is extended or adjusted under 35 U.S.C. 154(b) by 195 days.

(21) Appl. No.: 16/011,867

(22) Filed: Jun. 19, 2018

(65) Prior Publication Data

US 2019/0140289 A1 May 9, 2019

Related U.S. Application Data

(63) Continuation of application No. 14/621,399, filed on Feb. 13, 2015, now Pat. No. 10,062,913, which is a
(Continued)

(51) Int. Cl.
*H01M 8/04014* (2016.01)
*H01M 8/0271* (2016.01)
(Continued)

(52) U.S. Cl.
CPC ....... *H01M 8/04014* (2013.01); *H01M 8/004* (2013.01); *H01M 8/0263* (2013.01);
(Continued)

(58) Field of Classification Search
None
See application file for complete search history.

(56) References Cited

U.S. PATENT DOCUMENTS 4,324,844 A 4/1982 Kothmann
4,407,904 A 10/1983 Uozumi et al.
(Continued)

FOREIGN PATENT DOCUMENTS

AT 407589 B 8/2000
CA 2437891 A1 8/2002
(Continued)

OTHER PUBLICATIONS

The Examination Report issued by the Canadian Intellectual Property Office dated Jun. 10, 2019 in connection with Canadian patent application No. 2,919,875.
(Continued)

*Primary Examiner* — Scott J. Chmielecki
(74) *Attorney, Agent, or Firm* — Cook Alex, Ltd.; Ryan M. Truesdale

(57) ABSTRACT

A fuel cell power module includes a cylindrical housing encasing a fuel cell stack and an air supply. The housing has a major interior surface. The fuel cell stack can be cylindrical or hexagonal, and comprises fuel cells having an anode and an anode flow field plate, a cathode and a cathode flow field plate, and a membrane electrolyte interposed between the anode and the cathode. The air supply is directed to the plurality of fuel cell cathode flow field plates via a plenum defined by a space between the fuel cell stack and the housing major interior surface. The hexagonal fuel cell stack can be formed by a plurality of fuel cell groups shaped such that when aligned the fuel cell groups together constitute the hexagonal fuel cell stack.

20 Claims, 22 Drawing Sheets

Related U.S. Application Data continuation of application No. PCT/CA2013/050626, filed on Aug. 14, 2013.

(60) Provisional application No. 61/801,532, filed on Mar. 15, 2013, provisional application No. 61/683,156, filed on Aug. 14, 2012.

(51) Int. Cl.

| | |
|---|---|
| *H01M 8/0265* | (2016.01) |
| *H01M 8/0267* | (2016.01) |
| *H01M 8/241* | (2016.01) |
| *H01M 8/0263* | (2016.01) |
| *H01M 8/2483* | (2016.01) |
| *H01M 8/2484* | (2016.01) |
| *H01M 8/2475* | (2016.01) |
| *H01M 8/248* | (2016.01) |
| *H01M 8/04029* | (2016.01) |
| *H01M 8/04007* | (2016.01) |
| *H01M 8/04082* | (2016.01) |
| *H01M 8/00* | (2016.01) |
| *H01M 8/04089* | (2016.01) |
| *H01M 8/04291* | (2016.01) |
| *H01M 8/1018* | (2016.01) |

(52) U.S. Cl.
CPC ....... *H01M 8/0265* (2013.01); *H01M 8/0267* (2013.01); *H01M 8/0271* (2013.01); *H01M 8/04029* (2013.01); *H01M 8/04067* (2013.01); *H01M 8/04104* (2013.01); *H01M 8/04201* (2013.01); *H01M 8/04291* (2013.01); *H01M 8/241* (2013.01); *H01M 8/248* (2013.01); *H01M 8/2475* (2013.01); *H01M 8/2483* (2016.02); *H01M 8/2484* (2016.02); *H01M 2008/1095* (2013.01)

(56) References Cited

U.S. PATENT DOCUMENTS

| | | | |
|---|---|---|---|
| 4,490,445 A | 12/1984 | Hsu | |
| 4,770,955 A | 9/1988 | Ruhl | |
| 4,910,100 A | 3/1990 | Nakanishi | |
| 4,953,634 A | 9/1990 | Nelson et al. | |
| 5,338,622 A | 8/1994 | Hsu et al. | |
| 5,399,442 A * | 3/1995 | Shundo | H01M 8/021 429/458 |
| 5,514,486 A | 5/1996 | Wilson | |
| 5,527,634 A | 6/1996 | Meacham | |
| 5,549,983 A | 8/1996 | Yamanis | |
| 5,589,285 A | 12/1996 | Cable | |
| 5,595,834 A | 1/1997 | Wilson et al. | |
| 5,851,689 A * | 12/1998 | Chen | H01M 8/0247 429/429 |
| 6,048,633 A | 4/2000 | Fujii et al. | |
| 6,161,610 A | 12/2000 | Azar | |
| 6,234,245 B1 | 5/2001 | Reid et al. | |
| 6,245,453 B1 | 6/2001 | Iwase et al. | |
| 6,253,835 B1 | 7/2001 | Chu et al. | |
| 6,258,474 B1 | 7/2001 | Diethelm et al. | |
| 6,291,089 B1 | 9/2001 | Piaschik et al. | |
| 6,337,794 B1 | 1/2002 | Agonafer et al. | |
| 6,344,290 B1 | 2/2002 | Bossell et al. | |
| 6,406,809 B1 | 6/2002 | Fujii et al. | |
| 6,423,437 B1 | 7/2002 | Kenyon | |
| 6,528,196 B1 | 3/2003 | Fujii et al. | |
| 6,551,736 B1 | 4/2003 | Gurau et al. | |
| 6,586,128 B1 | 7/2003 | Johnson et al. | |
| 6,663,992 B2 | 12/2003 | Lehnert et al. | |
| 6,664,693 B2 | 12/2003 | Leger et al. | |
| 6,686,082 B2 | 2/2004 | Leger et al. | |
| 6,699,614 B2 | 3/2004 | Rock | |
| 6,722,422 B1 | 4/2004 | Feldmeier | |
| 6,729,383 B1 | 5/2004 | Cannell et al. | |
| 6,756,149 B2 | 6/2004 | Knights et al. | |
| 6,773,843 B2 * | 8/2004 | Kitagawa | H01M 8/241 429/457 |
| 6,849,353 B2 | 2/2005 | Vora et al. | |
| 6,903,931 B2 | 6/2005 | McCordic et al. | |
| 6,921,598 B2 | 7/2005 | Yamamoto | |
| 7,008,712 B2 | 3/2006 | Naruse et al. | |
| 7,067,213 B2 | 6/2006 | Boff et al. | |
| 7,108,929 B2 | 9/2006 | Kutrz et al. | |
| 7,138,200 B1 | 11/2006 | Iwase et al. | |
| 7,316,853 B2 | 1/2008 | Takagi et al. | |
| 7,348,094 B2 | 3/2008 | Thompson et al. | |
| 7,399,547 B2 | 7/2008 | Perry | |
| 7,459,227 B2 | 12/2008 | Rock et al. | |
| 7,517,602 B2 * | 4/2009 | Homma | H01M 8/0254 429/402 |
| 7,524,575 B2 | 4/2009 | Bai et al. | |
| 7,593,230 B2 | 9/2009 | Abul-Haj et al. | |
| 7,601,452 B2 | 10/2009 | Goebel | |
| 7,615,308 B2 | 11/2009 | Frederiksen et al. | |
| 7,618,734 B2 | 11/2009 | Rapaport et al. | |
| 7,718,298 B2 | 5/2010 | Tighe et al. | |
| 7,781,087 B2 | 8/2010 | Rock et al. | |
| 7,838,139 B2 | 11/2010 | Turpin et al. | |
| 7,838,169 B2 | 11/2010 | Montie et al. | |
| 7,883,813 B2 | 2/2011 | Lyle et al. | |
| 8,026,013 B2 * | 9/2011 | Valensa | H01M 8/2475 429/458 |
| 8,026,020 B2 | 9/2011 | Spink et al. | |
| 8,157,527 B2 | 4/2012 | Piggush et al. | |
| 8,557,462 B2 | 10/2013 | An et al. | |
| 2001/0003302 A1 | 6/2001 | Azar | |
| 2001/0003309 A1 | 6/2001 | Aoyagi et al. | |
| 2002/0012463 A1 | 1/2002 | Yamada | |
| 2002/0017463 A1 | 2/2002 | Merida-Donis | |
| 2003/0059662 A1 | 3/2003 | Debe et al. | |
| 2003/0077501 A1 | 4/2003 | Knights et al. | |
| 2004/0023100 A1 | 2/2004 | Boff et al. | |
| 2004/0067405 A1 | 4/2004 | Turpin et al. | |
| 2004/0099045 A1 | 5/2004 | Demarest et al. | |
| 2004/0142225 A1 | 7/2004 | Turpin et al. | |
| 2005/0081552 A1 | 4/2005 | Nilson et al. | |
| 2005/0112428 A1 | 5/2005 | Freeman et al. | |
| 2005/0115825 A1 | 6/2005 | Frank et al. | |
| 2005/0123821 A1 | 6/2005 | Al-Quattan et al. | |
| 2005/0142425 A1 * | 6/2005 | Homma | H01M 8/0254 429/457 |
| 2005/0221152 A1 | 10/2005 | Turpin et al. | |
| 2005/0271909 A1 | 12/2005 | Bai et al. | |
| 2006/0093891 A1 | 5/2006 | Issacci et al. | |
| 2006/0234107 A1 | 10/2006 | Leger et al. | |
| 2006/0257704 A1 | 11/2006 | Ogino et al. | |
| 2007/0009781 A1 | 1/2007 | Dong | |
| 2007/0099062 A1 | 5/2007 | Leonida | |
| 2007/0105000 A1 | 5/2007 | Chapman et al. | |
| 2007/0178359 A1 | 8/2007 | Peng et al. | |
| 2007/0289718 A1 | 12/2007 | McCordic et al. | |
| 2008/0008916 A1 | 1/2008 | Shin et al. | |
| 2008/0066888 A1 | 3/2008 | Tong et al. | |
| 2008/0070080 A1 | 3/2008 | Miyazaki et al. | |
| 2008/0096083 A1 * | 4/2008 | Kuan | H01M 8/04089 429/444 |
| 2008/0107946 A1 | 5/2008 | Gunji et al. | |
| 2008/0213648 A1 | 9/2008 | Montie et al. | |
| 2008/0248367 A1 * | 10/2008 | Chou | H01M 8/004 429/422 |
| 2008/0248371 A1 * | 10/2008 | Weng | H01M 8/004 429/483 |
| 2008/0280177 A1 | 11/2008 | Ose et al. | |
| 2008/0311461 A1 * | 12/2008 | Farrington | H01M 8/0247 429/454 |
| 2009/0035616 A1 * | 2/2009 | Darling | H01M 8/0258 429/429 |
| 2009/0053570 A1 * | 2/2009 | Tian | H01M 8/004 429/414 |

(56) References Cited

U.S. PATENT DOCUMENTS

| | | | |
|---|---|---|---|
| 2009/0081516 A1* | 3/2009 | Watanabe | H01M 8/0252 |
| | | | 429/497 |
| 2009/0145581 A1 | 6/2009 | Hoffman et al. | |
| 2009/0208803 A1 | 8/2009 | Farrington | |
| 2010/0119909 A1 | 5/2010 | McElroy et al. | |
| 2010/0178581 A1 | 7/2010 | An et al. | |
| 2010/0190087 A1 | 7/2010 | Yoshida et al. | |
| 2010/0203399 A1* | 8/2010 | Poshusta | H01M 8/04089 |
| | | | 429/408 |
| 2010/0216044 A1 | 8/2010 | Hawkins et al. | |
| 2010/0279189 A1* | 11/2010 | Wang | H01M 8/04201 |
| | | | 429/434 |
| 2011/0076585 A1* | 3/2011 | Edmonston | H04N 1/00381 |
| | | | 429/454 |
| 2011/0079370 A1 | 4/2011 | Wen et al. | |
| 2011/0097648 A1 | 4/2011 | Blank | |
| 2011/0159396 A1 | 6/2011 | Kleemann et al. | |
| 2011/0171023 A1 | 7/2011 | Lee et al. | |
| 2011/0171551 A1* | 7/2011 | Burmeister | H01M 8/04097 |
| | | | 429/434 |
| 2011/0177417 A1 | 7/2011 | Wolk et al. | |
| 2011/0223508 A1 | 9/2011 | Arnold | |
| 2011/0232885 A1 | 9/2011 | Kaslusky et al. | |
| 2011/0262826 A1* | 10/2011 | Dadheech | H01M 8/04201 |
| | | | 429/457 |
| 2011/0269037 A1* | 11/2011 | Burmeister | B01F 3/02 |
| | | | 429/415 |
| 2012/0107714 A1* | 5/2012 | Day | H01M 8/0273 |
| | | | 429/457 |
| 2012/0308911 A1 | 12/2012 | Peled et al. | |
| 2013/0149625 A1* | 6/2013 | Ikeya | B60L 3/0053 |
| | | | 429/439 |
| 2013/0252116 A1* | 9/2013 | Zhang | H01M 8/04828 |
| | | | 429/413 |
| 2015/0180052 A1 | 6/2015 | Leger et al. | |
| 2015/0180079 A1 | 6/2015 | Leger et al. | |
| 2015/0349353 A1 | 12/2015 | Hood et al. | |
| 2019/0140289 A1 | 5/2019 | Leger et al. | |

FOREIGN PATENT DOCUMENTS

| | | |
|---|---|---|
| CA | 2437892 A1 | 8/2002 |
| CA | 2441087 A1 | 10/2002 |
| CA | 2456731 A1 | 8/2004 |
| CA | 2880560 A1 | 7/2006 |
| CA | 2653148 A1 | 8/2009 |
| CA | 2787467 A1 | 7/2011 |
| CN | 1491446 A | 4/2004 |
| CN | 1663067 A1 | 8/2005 |
| CN | 101099253 A | 1/2008 |
| CN | 102089911 A | 6/2011 |
| DE | 10054444 A1 | 10/2007 |
| EP | 0207799 A2 | 1/1987 |
| EP | 035420 B1 | 10/1993 |
| EP | 0694216 B1 | 1/1996 |
| EP | 1496558 A1 | 1/2005 |
| EP | 1410455 B1 | 8/2006 |
| EP | 1512192 B1 | 5/2008 |
| EP | 2113731 A1 | 11/2009 |
| JP | S61256568 A | 11/1986 |
| JP | H3276569 A | 12/1991 |
| JP | H4370664 A | 12/1992 |
| JP | H6267564 A | 9/1994 |
| JP | H9050817 A | 2/1997 |
| JP | H11016590 A | 1/1999 |
| JP | H132001006717 A | 1/2001 |
| JP | 2009081061 A | 4/2009 |
| JP | H202009081061 A | 4/2009 |
| JP | H245029813 B2 | 9/2012 |
| WO | 2002065566 A1 | 8/2002 |
| WO | 2002089244 A1 | 11/2002 |
| WO | 2006120027 A1 | 11/2006 |
| WO | 2011028389 A2 | 3/2011 |
| WO | 2014056110 A1 | 4/2014 |

OTHER PUBLICATIONS

The Examination Report issued by the Canadian Intellectual Property Office dated Aug. 6, 2019 in connection with Canadian patent application No. 2,925,051.

The Extended European Search Report issued by the European Patent Office dated Oct. 18, 2019 in connection with European patent application No. 17769212.6.

Claiborne, H.C., "Heat Transfer in Non-Circular Ducts", Oak Ridge National Laboratory operated by Carbide and Carbon Chemicals Co., 1951, pp. 1-43.

Montgomery, S.R. et al., "Laminar Flow Heat Transfer for Simultaneously Developing Velocity and Temperature Profiles in Ducts of Rectangular Cross Section", Appl. Sci. Res., vol. 18, 1967, pp. 247-259.

Barrow, H. et al., "The Effect of Velocity Distribution on Forced Convection Laminar Flow Heat Transfer in a Pipe at Constant Wall Temperature", Warme und Stoffubertragung, Bd. 3, 1970, pp. 227-231.

Biber, C. R., "Pressure Drop and Heat Transfer in an Isothermal Channel with Impinging Flow", IEEE Transactions on Components, Packaging, and Manufacturing Technology Part A, vol. 20(4), 1997, pp. 458-462.

Soule, C. A., "Future Trends in Heat Sink Design", https://www.electronics-cooling.com/2001/02/future-trends-in-heat-sink-design/, 2001, accessed Dec. 6, 2018.

Banker, R., et al., "Experimental and Computational Investigation of the Hydrodynamics and Heat Transfer in a Flat Channel of Variable Width for Smooth and Intensified Surfaces", Heat Transfer Research, vol. 35, 2004, pp. 1-10.

Koz, M. et al., "A Preliminary Study for 3D Numerical Simulation of a Throughplane Temperature Profile in a PEMFC Incorporating Coolant Channels", Proceedings of the ASME 2012 10th International Conference on Nanochemicals, Microchannels, and Minichannels, ICNNM12, Jul. 8-12, 2012, Rio Grande, Puerto Rico, pp. 1-10.

Kuan, et al., "Heat-Transfer Analysis of a Water-Cooled Channel for the TPS Front-End Components", THPF1072, Proceedings of IPAC2013, Shanghai, China, 2013, pp. 3466-3468.

The Notice of Allowance issued by the USPTO dated Jan. 31, 2020 in connection with U.S. Appl. No. 14/622,830.

Sammes, N., ed. Fuel cell technology: reaching towards commercialization. Springer Science & Business Media, 2006.

Marangio et al., "Theoretical model and experimental analysis of a high pressure PEM water electrolyser for hydrogen production", International Journal of Hydrogen Energy, 2009, pp. 1143-1158, vol. 34.

Remick, "Reversible Fuel Cells Workshop Summary Report", U.S. Department of Energy, 2011, pp. 1-150.

Hwang et al., "Flow Field Design for a Polymer Electrolyte Unitized Reversible Fuel Cell", Honolulu PRiME, 2012, Abstract #1405.

Bonghwan et al., "Dynamic Simulation of PEM Water Electrolysis and Comparison with Experiments", Int. J. Electrochem. Sci., 2013, pp. 235-248, vol. 8.

International Search Report and Written Opinion dated Sep. 24, 2013 in connection with International Application No. PCT/CA2013/050626.

International Search Report dated Nov. 13, 2013 in connection with International Application No. PCT/CA2013/050627.

International Search Report dated Nov. 15, 2013 in connection with International Application No. PCT/CA2013/050769.

International Preliminary Report dated Feb. 26, 2015 in connection with International Application No. PCT/CA2013/050627.

International Preliminary Report on Patentability dated Feb. 26, 2015 in connection with International Application No. PCT/CA2013/050626.

International Preliminary Report on Patentability dated Apr. 23, 2015 in connection with International Application No. PCT/CA2013/050769.

Office Action dated Oct. 10, 2016 in connection with Chinese Patent Application No. 201380064598.4.

Office Action dated Oct. 17, 2016 in connection with Chinese Patent Application No. 201380053699.1.

(56) References Cited

OTHER PUBLICATIONS

International Search Report and Written Opinion dated Jun. 15, 2017 in connection with International Application No. PCT/CA2017/050358.
International Preliminary Report on Patentability dated Jun. 27, 2018 in connection with International Application No. PCT/CA2017/050358.
Office Action issued in connection with CA App. No. 2,919,875 dated Feb. 7, 2020.
Examination Report issued in connection with UK App. No. GB1503750.0 dated Feb. 24, 2020.
1st Office Action issued in connection with Chinese App. No. 201710699586.9 dated Feb. 25, 2020.
1st Office Action issued in connection with Chinese App. No. 201710699589.2 dated Mar. 3, 2020.
Examination Report issued in connection with UK App. No. GB1503751.8 dated Mar. 18, 2020.
1st Office Action issued in connection with Chinese App. No. 201711004994.4 dated Mar. 24, 2020.
Office Action issued in connection with Canadian App. No. 2,925,051 dated Apr. 30, 2020.

* cited by examiner

FUEL CELL COMPONENTS, STACKS AND MODULAR FUEL CELL SYSTEMS

CROSS-REFERENCE TO RELATED APPLICATION(S)

This application is a continuation of U.S. application Ser. No. 14/621,399 filed on Feb. 13, 2015 entitled "Fuel Cell Components, Stacks and Modular Fuel Cell Systems" which claims priority benefit from International Application No. PCT/CA2013/050626 filed on Aug. 14, 2013, also entitled "Fuel Cell Components, Stacks and Modular Fuel Cell Systems". This application is also related to and claims priority benefit from the '626 application. This application is also related to and claims priority benefits from U.S. application Ser. No. 61/683,156 filed on Aug. 14, 2012, entitled "Fuel Cell Components, Stacks and Systems Based on a Cylindrical Fuel Cell Stack Architecture" and U.S. application Ser. No. 61/801,532 filed on Mar. 15, 2013, entitled "Reactant Flow Fields for Electrolyzer Applications".

The '399, '626, '156 and '532 applications are hereby incorporated by reference herein in their entireties.

FIELD OF THE INVENTION

The present invention relates to electrochemical fuel cells and in particular to cylindrical and other non-conventional proton exchange membrane (PEM) fuel cell stack architectures, as well as components of such stacks, and modular fuel cell systems comprising one or more such stacks along with other balance-of-plant components.

BACKGROUND OF THE INVENTION

Although the majority of PEM fuel stacks are rectangular, cylindrical PEM fuel cell stacks are known. For example, passive, air-breathing cylindrical fuel cell stacks that are not humidified, cooled, or pressurized are described in U.S. Pat. Nos. 5,514,486 and 5,595,384. In these stacks annular fuel cell components are distributed along a common axis and held together by a single bolt extending between a pair of end-plates. A central, longitudinal fuel distribution manifold is connected to distribute fuel from a fuel inlet port (offset from the center of one of the end plates) axially along the stack and deliver fuel to fuel flow fields contacting the anodes. Air is supplied to the cathodes by passive diffusion from the stack periphery toward the center of the stack through porous flow fields. The fuel flow fields are sealed at the periphery of the stack, and the oxygen flow fields are sealed around the annular region or central opening, so both reactants are dead-ended. U.S. Pat. No. 6,773,843 describes a stack with similar architecture, but where the fuel is supplied from the center of the end-plate directly into the central, longitudinal fuel distribution manifold. Such passive, air-breathing stacks are generally capable of only relatively low power output. Also product water management and heat management can be challenging with this type of design.

Other cylindrical stacks include a solid oxide fuel cell (SOFC) or PEM fuel cell stacks that have a central internal manifold that is split into two compartments for supplying both fuel and oxidant to a plurality of annular anode and cathode plates, respectively, such as described in U.S. Pat. Nos. 5,549,983 and 6,291,089. In this stack design both fuel and oxidant flow radially from the center to the periphery of each fuel cell in a co-flow configuration. This design is not dead-ended on either reactant (although the intention is that the fuel is almost completely consumed), and the spent reactant streams exit the periphery of the stack into an enclosing vessel, where they are combined and discharged via a single exhaust port. In some embodiments the enclosing vessel houses more than one stack, and the interior of the vessel is subdivided to form separate fuel supply, oxidant supply and reactant exhaust compartments, each with an associated external port.

The routing and distribution of the reactant streams is a significant challenge with existing cylindrical fuel cell stack architectures. The challenges include ensuring sufficiently uniform flow distribution within and among individual fuel cells in the stack, and providing effective sealing to prevent mixing of the fuel and oxidant streams.

The present invention relates to a cylindrical, hexagonal and other fuel cell stack architectures with improved routing and distribution of the reactant streams. These fuel cell stack architectures offer other advantages as described herein. One or more stacks can be incorporated into a self-contained fuel cell power module which is convenient to use, and is scalable for different end-use applications.

SUMMARY OF THE INVENTION

The operational challenges mentioned above are met by a fuel cell power module comprising:
  (a) a cylindrical housing having a major interior surface;
  (b) a cylindrical fuel cell stack contained within the housing, the fuel cell stack comprising a plurality of fuel cells interposed between a pair of compression end-plates, each of the fuel cells comprising an anode and an anode flow field plate, a cathode and a cathode flow field plate, and a membrane electrolyte interposed between the anode and the cathode; and
  (c) an air supply directed to the plurality of fuel cell cathode flow field plates via an annular plenum defined by a space between the cylindrical fuel cell stack and the cylindrical housing major interior surface.

In a preferred embodiment, the air supply comprises an axially-mounted fan-motor assembly contained within the housing. The fuel cell power module can further comprise an air filter contained within the housing, the air filter capable of filtering the air supplied to the plurality of cathode flow field plates by the fan-motor assembly.

In a preferred embodiment, the annular plenum serves as an oxidant supply manifold and the axially-mounted fan-motor assembly directs the air into the plenum such that at least a portion of the air (i) enters the plurality of cathode flow field plates, (ii) flows substantially radially through the plurality of cathode flow field plates, and (iii) exits the fuel cell stack via a central oxidant exhaust manifold.

In a preferred embodiment, the space between the fuel cell stack and the cylindrical housing major interior surface is sufficiently wide to substantially negate a pressure drop between a top portion of the annular plenum and a lower portion of the annular plenum. The space is preferably sufficiently wide to provide substantially uniform air flow distribution to each of the plurality of fuel cell cathode plates.

In a preferred embodiment, the fuel cell stack is located substantially concentrically within the cylindrical housing, whereby substantially uniform air flow distribution is provided to each of the fuel cell cathode flow field plates.

In a preferred embodiment, the fuel cell power module further comprises a fuel inlet manifold comprising aligned first openings formed in each of the plurality of fuel cells for directing a fuel supply stream to each of the plurality of anode flow field plates, and a fuel outlet manifold comprising aligned second openings formed in each of the plurality of fuel cells for discharging a fuel exhaust stream from each of the plurality of anode flow field plates.

In another embodiment, when the fuel cell stack is connected to a source of substantially pure fuel, and the fuel outlet manifold preferably further comprises a purge mechanism for periodic discharging of a depleted fuel stream from the anode flow field plates.

In a preferred embodiment, the fuel cell power module further comprises a plurality of coolant pathways, each of the pathways being disposed between adjacent pairs of the plurality of fuel cells.

In a preferred embodiment, the air supply is capable of supplying air to the plurality of coolant pathways via the annular plenum. The fuel cell power module preferably further comprises an adjustment mechanism for adjusting air flow to the plurality of cathode flow field plates and for adjusting air flow to the plurality of coolant pathways. The coolant pathways are preferably fluidly connected to a liquid coolant circulation system. The coolant pathways preferably comprise a plurality of coolant channels formed in at least some of the anode or cathode flow field plates.

In a preferred embodiment, the fuel cell power module further comprises a humidifier for humidifying a reactant stream supplied to the plurality of fuel cells. The humidifier is preferably contained within the cylindrical housing.

In a preferred embodiment, a positive and a negative electrical terminal, respectively, protrude from opposite ends of the fuel cell power module for connecting the fuel cell power module to an electrical load.

In a preferred embodiment, the cylindrical housing comprises a compression mechanism for compressing the fuel cell stack. The compression mechanism can comprise a threaded end plate capable of engaging a corresponding threaded portion of the major interior of the cylindrical housing, such that applying rotational force to the end plate urges the end plate toward the cylindrical fuel cell stack. The compression mechanism can also comprise a notched end plate capable of engaging a corresponding notched receptacle formed in the major interior of the cylindrical housing, such that the end plate is urged toward the fuel cell stack when the notched end plate engages the notched receptacle.

The operational challenges mentioned above are also met by a fuel cell power module comprising:

(a) a cylindrical housing having a major interior surface;

(b) a hexagonal fuel cell stack contained within the housing, the fuel cell stack comprising a plurality of fuel cells interposed between a pair of compression end-plates, each of the fuel cells comprising an anode and an anode flow field plate, a cathode and a cathode flow field plate, and a membrane electrolyte interposed between the anode and the cathode; and (c) an air supply directed to the plurality of fuel cell cathode flow field plates via a plenum defined by a space between the hexagonal fuel cell stack and the cylindrical housing major interior surface.

In a preferred embodiment of the foregoing fuel cell module, at least one of the anode, the anode flow field plate, the cathode and the cathode flow field plate of the hexagonal fuel cell stack comprises sheet material shaped in the form of one of a triangle, square, rectangle, parallelogram and half-hexagon, the shaped sheet material capable of being fitted together into a hexagonal assembly.

The hexagonal fuel cell stack can be formed by a plurality of fuel cell groups shaped such that when aligned the fuel cell groups together constitute the hexagonal fuel cell stack. Two or more of the fuel cell groups can be electrically connected either in series or in parallel.

BRIEF DESCRIPTION OF THE DRAWINGS

FIG. 15b is a close-up view of the mesh material shown in FIG. 15a.

FIG. 19b is a plan view of the other side of the anode flow field plate FIG. 19a.

DETAILED DESCRIPTION OF PREFERRED EMBODIMENTS

In some aspects of the present technology, a cylindrical fuel cell stack comprises a plurality of annular components that are stacked and generally aligned along a common, central axis. The annular components include a polymer electrolyte membrane, an anode and a cathode contacting opposite sides of the membrane, and fuel and oxidant flow field plates contacting the anode and the cathode, respectively. Further details of the stack architecture are described below. This architecture can provide a high power density and offers many other advantages.

In some fuel cell systems comprising this stack, some or all of the balance-of-plant components are separate and can service one or multiple stacks in an overall fuel cell power generation system.

In preferred embodiments the cylindrical fuel cell stack is enclosed in a cylindrical housing. Some or all of the balance-of-plant components necessary for an operational fuel cell system can also be contained within the housing. For example, a fuel cell power module can comprise a housing enclosing a fuel cell stack and other components such as fans or pumps, sensors, filters, and/or a control board. In some cases the power module can be a self-contained power generation module that supplies electrical power when fuel, oxidant and optionally a coolant are supplied to the fuel cell stack within the module. For some applications, a cylindrical fuel cartridge can be incorporated or integrated into a power module for convenient packaging/installation.

Figure 1:
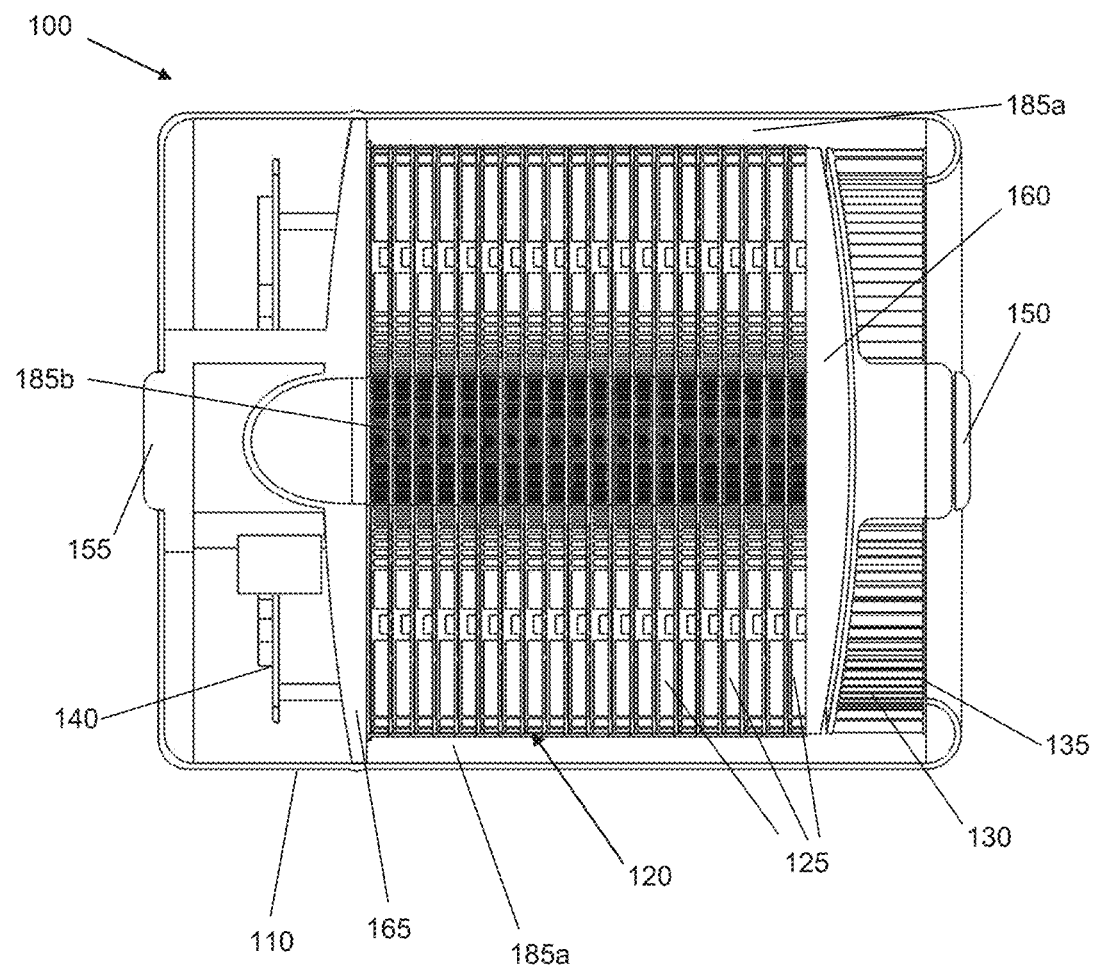
FIG. 1 is a cross-sectional view of an embodiment of a fuel cell power module comprising a cylindrical fuel cell stack integrated with other system components within a cylindrical housing.

FIG. 1 is a cross-sectional view of an example embodiment of a fuel cell power module 100 comprising a cylindrical plastic housing 110. Housing 110 contains a fuel cell stack 120 comprising twenty unit cells 125 interposed between a pair of compression end-plates 160 and 165. Housing 110 also contains an axially mounted squirrel-cage fan 130 for supplying air to the fuel cell cathodes, a filter 135 and a control board 140. The fan has an associated motor (not shown in FIG. 1). Positive and negative electrical terminals 150 and 155, respectively, protrude from each end of power module 100, and can be used to connect the power module to other modules or to an electrical load.

Figure 2A:
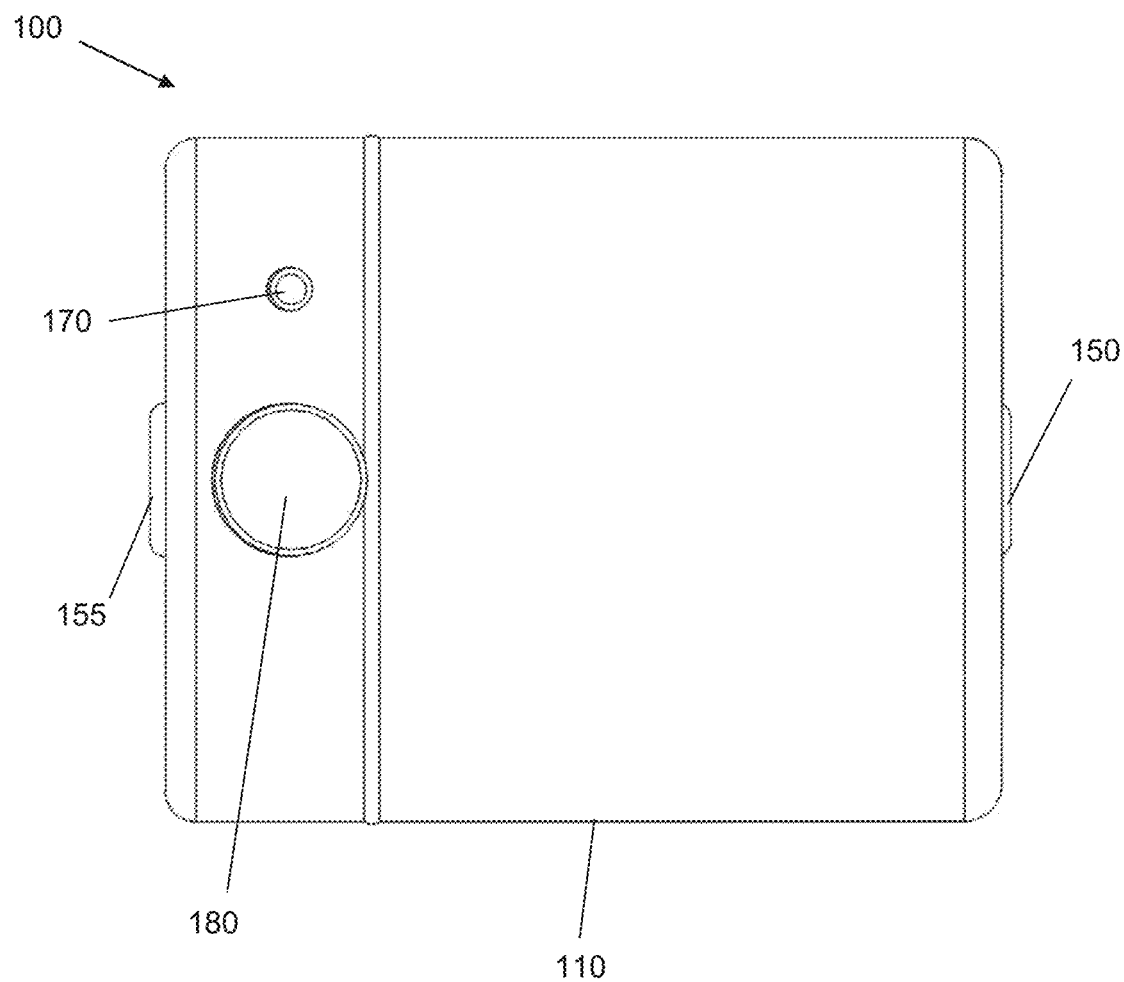
FIG. 2a is a side view of the fuel cell power module of FIG. 1.
Figure 2B:
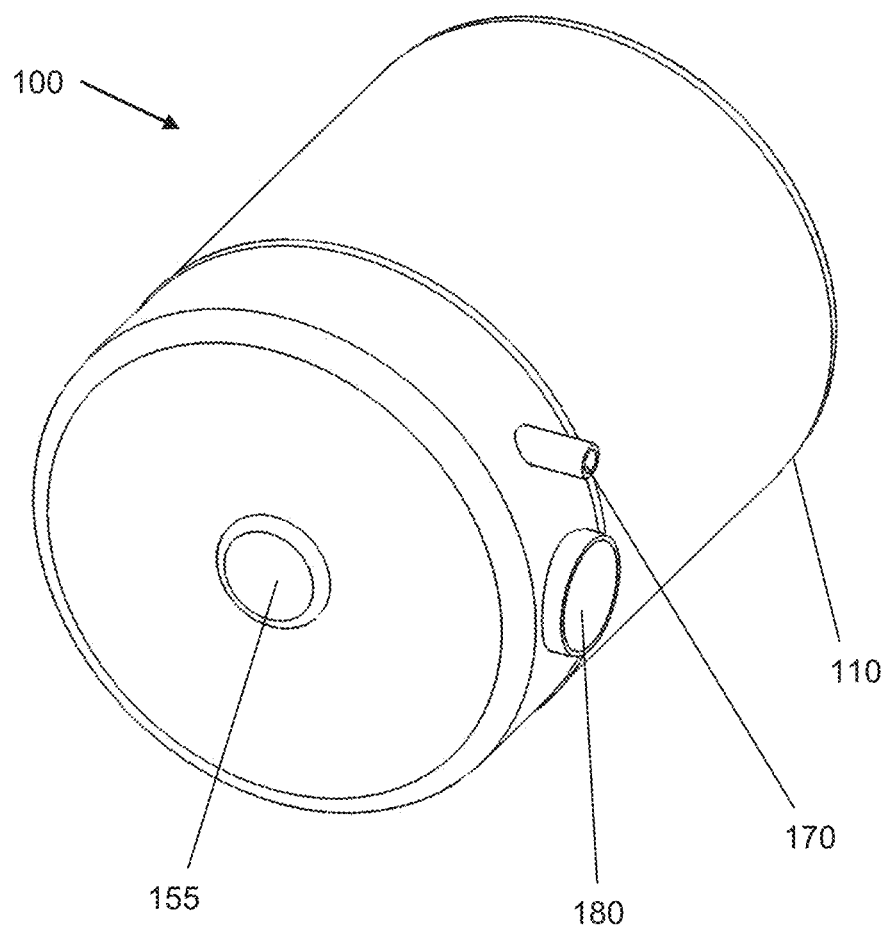
FIG. 2b is a three-dimensional view of the fuel cell power module of FIG. 1.

FIG. 2a is a side view and FIG. 2b is a three-dimensional view of power module 100 illustrating how the module is packaged, and showing fuel inlet port 170 and air (oxidant) outlet port 180.

Referring back to FIG. 1, the space or annular plenum 185a located between fuel cell stack 120 and the inner wall of housing 110 serves as the oxidant inlet manifold. Squirrel cage fan 130 directs an air stream into this space. The air stream then enters the fuel cell cathode flow field channels, flowing generally radially towards the central axis of stack 120 where it exits the channels into a central oxidant exhaust manifold 185b. The routing of the oxidant air stream through the stack is described in further detail below.

Preferably the size of the gap between stack 120 and the inner wall of the housing 110 (defining annular plenum 185a) is sufficiently wide that there is no significant pressure drop between the top portion of the manifold and the lower portion which is further away from the oxidant distribution plate. For taller stacks with comprising a larger number of fuel cells the gap may need to be wider to ensure sufficiently uniform flow distribution to each cathode via the oxidant flow field channels.

Preferably the stack is located concentrically with the housing (rather than being offset from the longitudinal axis), again to promote more uniform flow distribution into all oxidant channels regardless of where they are located on the periphery of the stack.

The cylindrical housing is generally easy to seal and is a robust shape for a pressure vessel, which means the wall thickness does not need to be so thick for a given pressure rating. The housing can be made of plastic, metal or another light-weight material. The housing provides a protective shield for the stack, thereby reducing the risk of electrical shorting between plates, reducing exposure to contaminants or spills, and protecting users from contact with hot surfaces during operation of the stack. It also contains leakage from the stack so that fuel leakage is discharged from the stack with the oxidant exhaust.

The cylindrical design is similar to a conventional battery and can be scaled to a range of sizes, for example, for stacks or power modules with volumes ranging from a few cc to several liters. The electrical terminals can be provided at the ends of the cylinder as shown (as in a conventional cylindrical battery), and can allow convenient installation into contact chambers or racks of different electrical configurations to provide the desired power (voltage/current) output depending on the end-use application. The user simply connects a high pressure hydrogen supply and in some cases a coolant, and optionally ports the exhaust air to the desired location. Alternatively, one or both of the electrical terminals can extend laterally from the side of the module.

Self-contained fuel cell power modules of a particular power rating can be conveniently combined and connected in parallel or series to provide the desired electrical output (voltage/current/power), depending on the end-use application. This scalable modularity is very flexible and allows a single product offering to service many end-use applications.

Cylindrical stacks or modules can be nested together in various space-efficient configurations.

Routing of Fluids Through the Cylindrical Fuel Cell Stack

Figure 3:
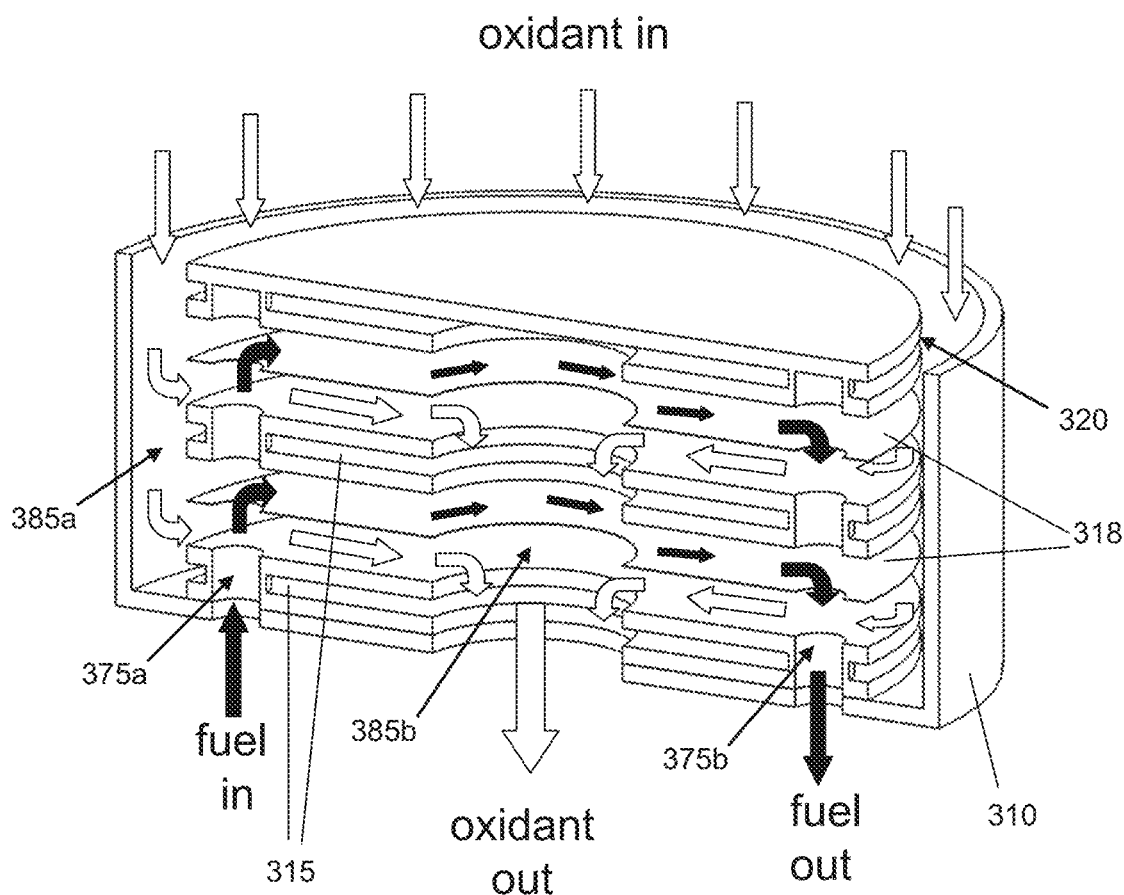
FIG. 3 is a perspective view in cross-section of a fuel cell power module comprising a cylindrical fuel cell stack, which illustrates the routing of fuel and oxidant into and through the stack (oxidant flow path indicated with white arrows and fuel flow path indicated with black arrows).

The manner in which the fuel and oxidant are routed into and through the fuel cell stack is different than in conventional cylindrical fuel cell stack designs, and is shown in more detail in a simplified diagram in FIG. 3. The oxidant routing is indicated with white arrows and the fuel routing is indicated with black arrows. The oxidant is supplied from the periphery of each cell in stack 320, via the cavity 385a defined between the stack 320 (a portion of which is shown FIG. 3 in an exploded view) and the housing 310 which serves as an oxidant supply manifold. The oxidant stream passes through the cathode flow field channels that direct the oxidant across the surface of the cathode of each membrane electrode assembly 318. The oxidant stream exits the cathode flow field at or near the center of each cell into a central oxidant exhaust manifold 385b that is defined by the aligned central openings in each fuel cell in the stack of annular fuel cells. The oxidant exhaust stream is discharged from one end of the central exhaust manifold 385b via an outlet port (shown as 180 in FIGS. 2a and 2b) in the housing. Various flow field patterns can be used for the oxidant flow path across the individual cathodes, as described in more detail below. In the embodiments illustrated in FIGS. 1-3, the stack is air-cooled by the same air stream that is used as the oxidant. The cooling air passes through cavities or gaps between adjacent pairs of anode and cathode plates and exits into the central oxidant exhaust manifold 385. The cavities can contain spacers, ribs, channels or other features to direct the cooling-air flow and/or support the plates, or they can be just an open plenum.

Besides the central oxidant exhaust manifold opening, there are at least two other openings formed in each fuel cell. These openings are aligned to form a fuel inlet manifold 375a, via which fuel is supplied to each anode flow field plate in the stack, and a fuel exhaust manifold 375b via which fuel can be discharged from the stack. FIG. 3 shows the routing of the fuel through the stack with black arrows. The fuel is supplied via fuel inlet port (shown as 170 in FIG. 2a) into fuel inlet manifold 375a, and passes through the anode flow fields, exiting via fuel outlet manifold 375b. The fuel exhaust stream can be discharged from one end of the stack as shown in FIG. 3. Various flow field patterns can be used for the fuel flow path across the individual anodes, as described in more detail below.

When the stack is to be operated on a substantially pure fuel, the exhaust manifold can be dead-ended and fitted with a purge mechanism for periodic or occasional purging. In some embodiments, such as the one illustrated in FIG. 3, the fuel inlet port and fuel exhaust port (or purge valve) are located at the same end of the stack as each other, and at the same end as the oxidant outlet port.

This stack architecture and routing of the reactants greatly simplifies the reactant manifolding and sealing relative to previous designs where both reactants are supplied via the central manifold, or where the oxidant is discharged and the fuel is supplied via the central manifold.

In some embodiments, a separate coolant stream is used to cool the fuel cell stack, and an additional pair of openings is provided in each fuel cell. These openings are aligned to form a coolant inlet manifold, via which a coolant fluid (such as liquid water) is supplied to coolant channels in the stack, and a coolant exhaust manifold via which coolant can be discharged from the stack.

Figure 4:
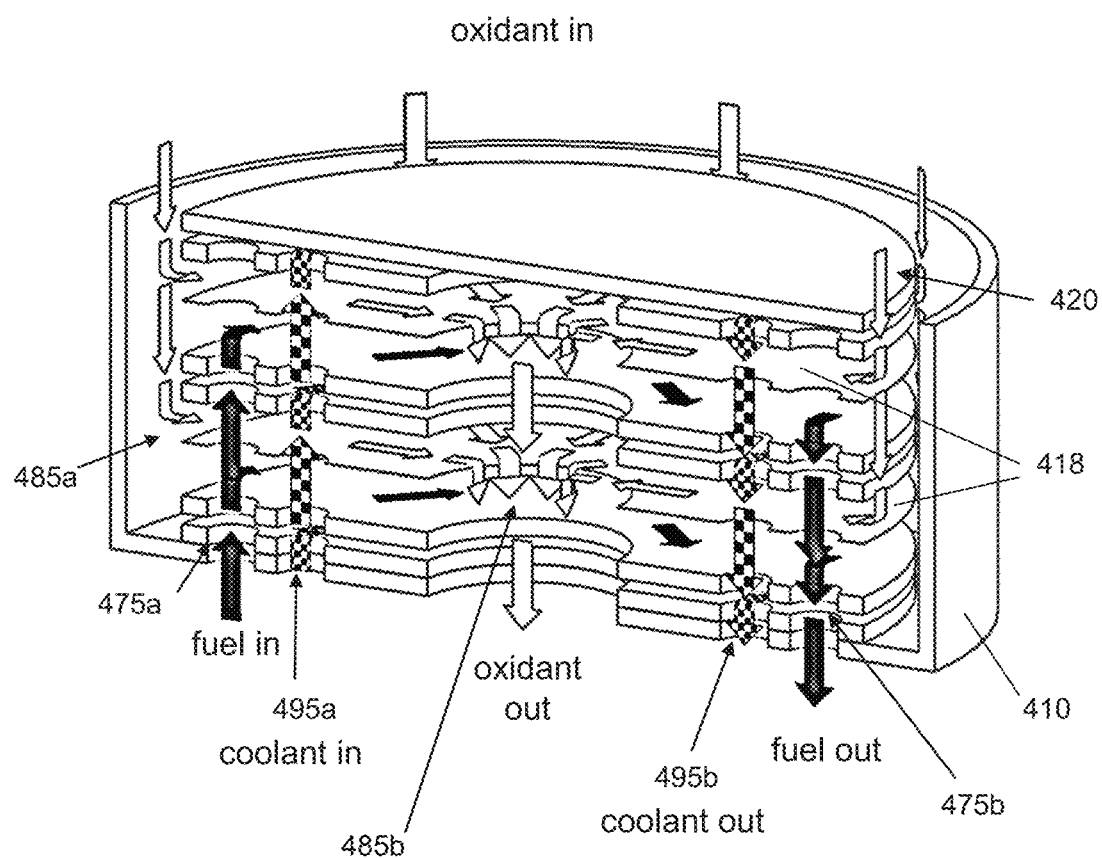
FIG. 4 is a perspective view in cross-section of a fuel cell power module comprising a cylindrical fuel cell stack, which illustrates the routing of fuel, oxidant and a separate coolant stream into and through the stack (oxidant flow path indicated with white arrows, fuel flow path indicated with black arrows, and coolant flow path indicated with checkered arrows).

The manner in which the fuel, oxidant and a coolant can be routed into and through the fuel cell stack is shown in a simplified diagram in FIG. 4. The oxidant routing is indicated with white arrows, the fuel routing is indicated with black arrows, and the coolant routing is indicated with checkered arrows. Again oxidant is supplied from the periphery of each cell in stack 420, via the cavity 485a defined between the stack 420 (a portion of which is shown FIG. 4 in an exploded view) and the housing 410. It passes across the upper surface of the cathode of each membrane electrode assembly 418, exiting the cathode flow field into central oxidant exhaust manifold 485b. Fuel is supplied via fuel inlet port (shown as 170 in FIG. 2a) into the fuel inlet manifold 475a, and passes through the anode flow fields adjacent the anodes on the lower surface of each membrane electrode assembly 418, exiting via fuel outlet manifold 475b. The coolant is directed from coolant inlet manifold 495a to coolant outlet manifold 495b via coolant flow field channels which can be provided between adjacent anode/cathode plates in the stack. Various flow field patterns can be used for the coolant flow path between the fuel cells, as described in more detail below. In some embodiments the coolant is a liquid which is circulated through the stack. In other embodiments it is a separate air stream which is blown or forced through the stack using a compressor, fan or pump.

Figure 5:
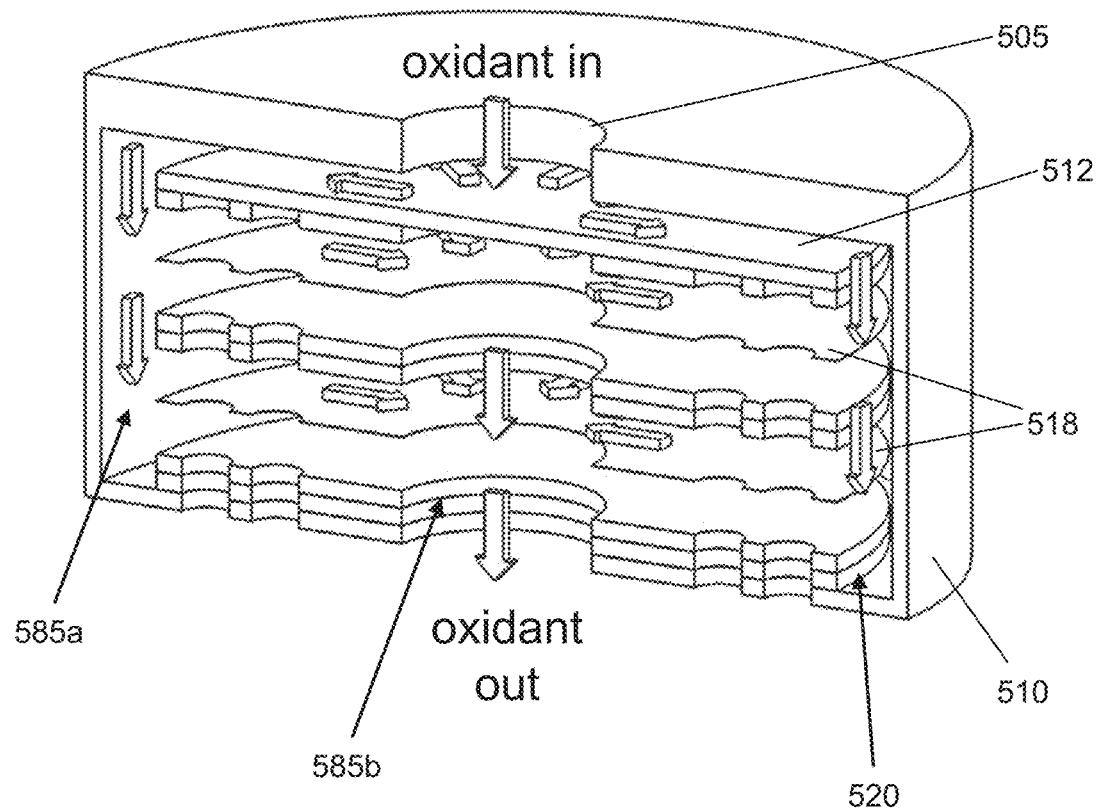
FIG. 5 shows a cylindrical fuel cell stack in a housing with a central oxidant inlet port and an oxidant distribution plate.

In embodiments without a squirrel cage fan, air can be supplied via a central inlet port (for example, from compressor or another pressurized source of air, or via another type of blower or fan) and then distributed to the perimeter of the stack via a distribution plate. FIG. 5 is a simplified diagram of a fuel cell stack 520 in a housing 510 with the oxidant flow path is indicated by white arrows. Air enters the housing 510 via a central inlet port 505, and is directed by air distribution plate 512 to the periphery of the stack 520 (which is shown FIG. 5 in an exploded view). Air distribution plate 512 can be non-conductive, and can have a radial pattern of channels. The air is then forced from oxidant inlet manifold 585a, through the oxidant flow field channels in contact with the cathode side of MEAs 518, exiting via central oxidant exhaust manifold 585b.

Humidification

Figure 6:
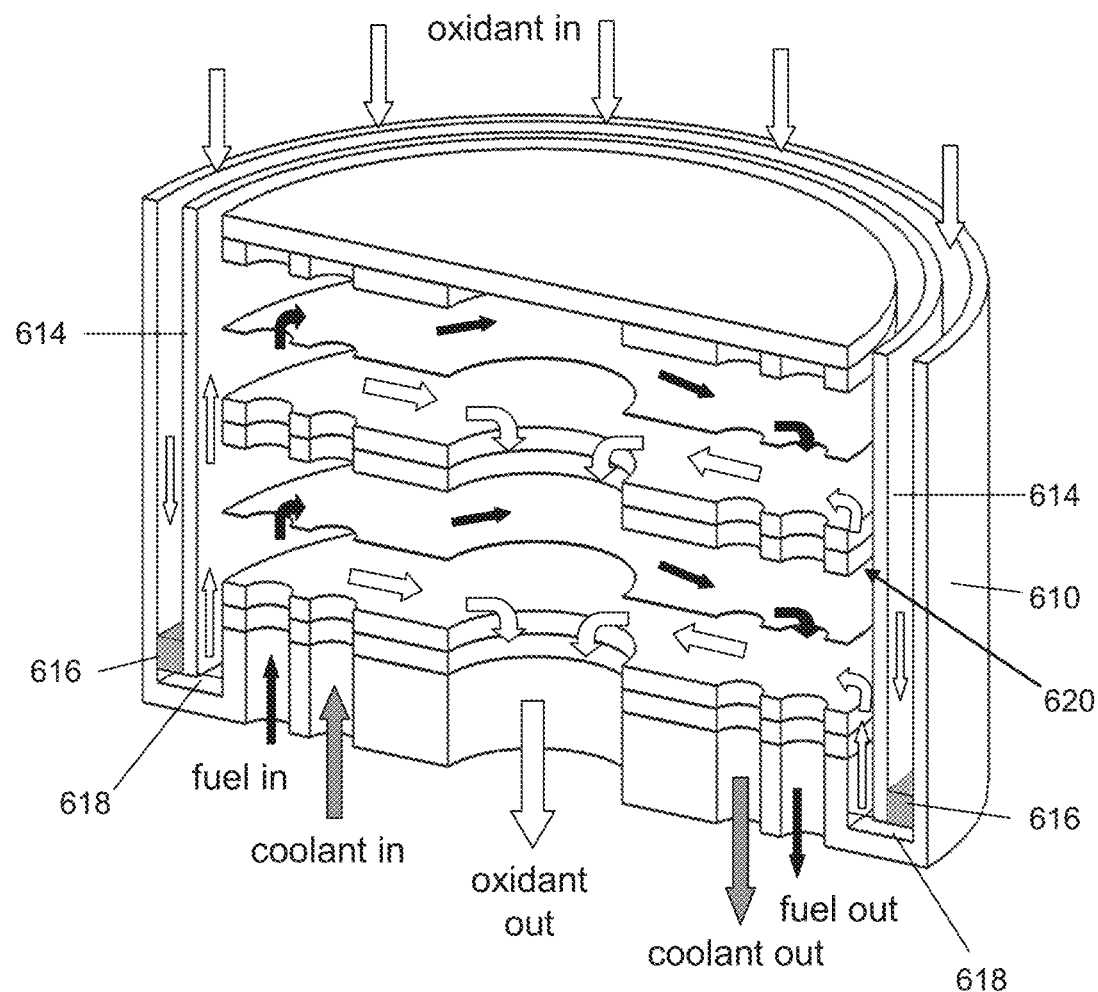
FIG. 6 is a perspective view in cross-section of a fuel cell power module comprising a cylindrical fuel cell stack in a housing with an internal bubbler humidifier, which illustrates the routing of fuel, oxidant and a separate coolant stream into and through the humidifier and stack (oxidant flow path indicated with white arrows, fuel flow path indicated with black arrows, and coolant flow path indicated with hatched arrows).

In some embodiments the oxidant and/or fuel stream supplied to the fuel cell stack is humidified. Any suitable humidifier can be incorporated into the oxidant and/or fuel supply path, either within the stack or housing or upstream of the stack or housing. FIG. 6 is a simplified diagram showing a fuel cell stack 620 (a portion of which is shown FIG. 6 in an exploded view) in a housing 610, where the oxidant stream is humidified within the housing 610 by passing through an internal bubbler humidifier. An inner wall or baffle 614 serves as a manifold divider splitting the oxidant inlet manifold so that the incoming oxidant stream is initially directed downwardly between with housing 610 and inner wall 614 and then through a layer of diffusive media 616, which is at least partially submerged in a shallow reservoir of deionized water 618. The oxidant stream forms bubbles and picks up moisture as it travels through the water. The humidified oxidant stream is then directed upwardly on the other side of the inner wall 614 and into the cathode flow fields as described in reference to FIGS. 3 and 4 above. In some embodiments, product water from the cathode exhaust stream is recovered to replenish the humidification reservoir, and/or the water can be replenished from an external source.

Cathode Flow Field

In the present stack architecture, the cathode flow field directs the oxidant along a generally radial path from the perimeter to the center of fuel cell. Preferably the channels decrease in width from inlet to outlet, and the width of the lands is roughly constant. This increases the area of open channel that is exposed to the MEA/catalyst and promotes uniform current density across the active area of each cell.

Preferably the channel width varies such that, for dilute oxidant streams such as air, the oxygen availability at every position along the channel is kept substantially constant for a given channel length and air stoichiometry ratio, as described in U.S. Pat. No. 7,838,169, which is incorporated herein by reference in its entirety. This results in substantially uniform current density across the active area of the fuel cell, which is desirable for efficient fuel cell operation and improved performance. The channel width can decrease according to a natural exponential function. In such case, the channel width at a selected lengthwise position of the channel can be proportional to a natural exponential function of the selected lengthwise position. The natural exponential function can also be a function of a constant derived from an air stoichiometry of a fuel cell in which the flow channel is incorporated. This constant can be a natural logarithm of a function of the air stoichiometry.

Figure 7A:
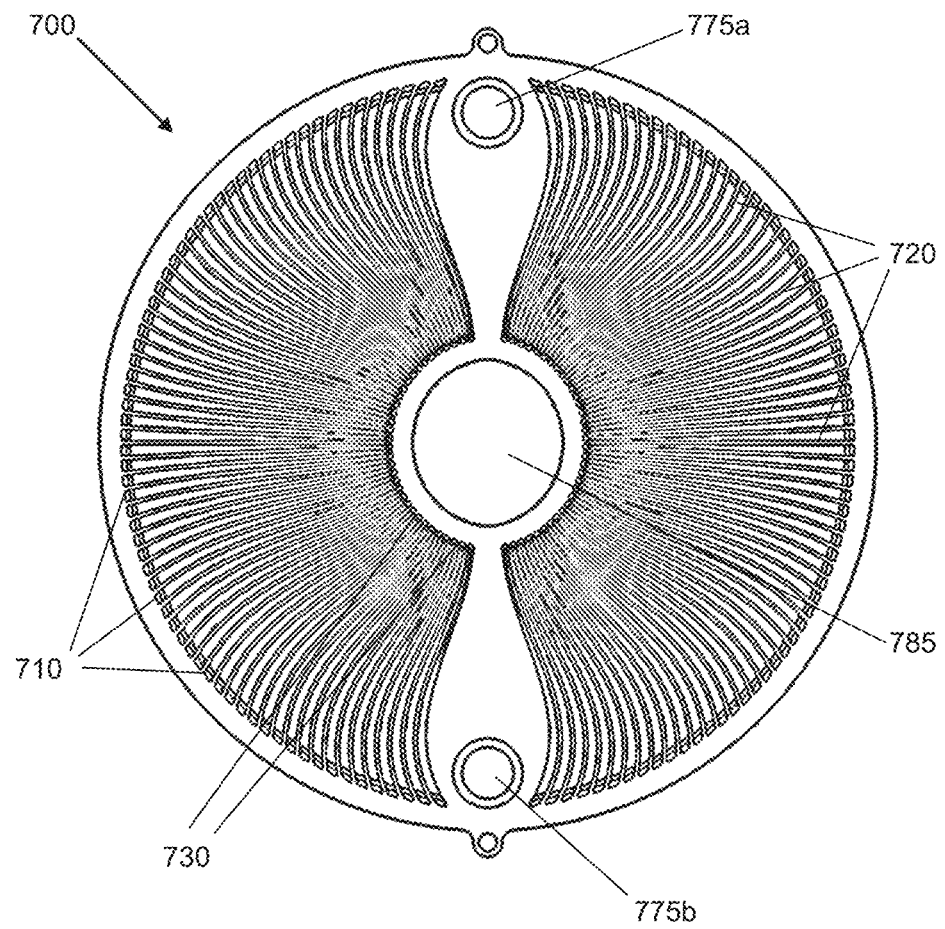
FIG. 7a is a plan view of an annular cathode flow field plate with a pair of fuel manifold openings.
Figure 12:
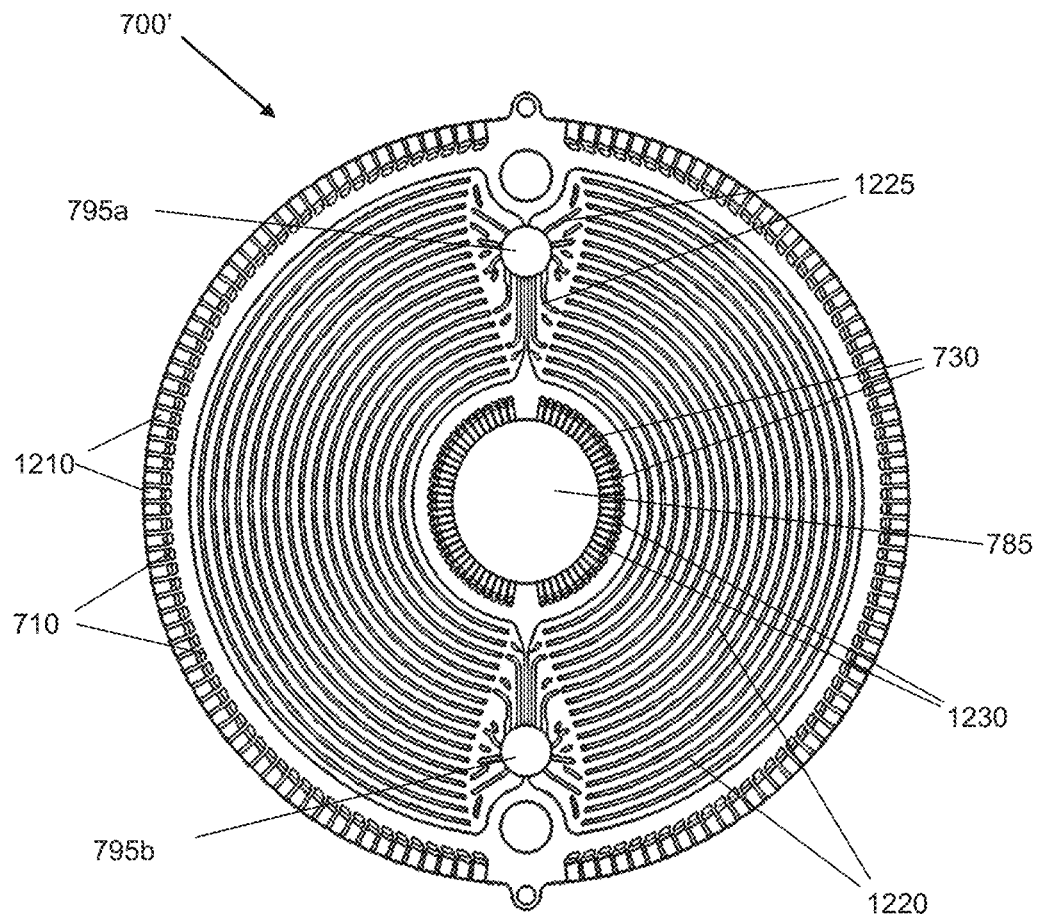
FIG. 12 is a plan view of the reverse side of the cathode flow field plate shown in FIG. 7b, showing an example coolant flow field.

FIG. 7a shows a plan view of an example of an annular cathode flow field plate 700, in which the width of the oxidant channels 720 varies such that the width at a selected lengthwise position along the channel is proportional to a natural exponential function of the selected lengthwise position. In the illustrated embodiment, keeping the land widths approximately constant results in a pattern where the most of the channels are curved. The depth of the channels is substantially constant along their length. The symmetrical pattern of curved channels provides two spaces to accommodate the fuel manifold openings 775a and 775b. The oxidant enters channels 720 from the other side of the plate 700 via small through-openings (holes) 710 formed around the circumferential portion of the plate. When the oxidant reaches the end of each channel 720 towards the center of the plate, it passes back through holes 730 in the plate to the other side and exits into the central opening 785 via short slots or grooves formed in the other side of the plate (as illustrated in FIG. 12 described below). This approach of using the other side of the plate for reactant access/discharge to and from the channels simplifies the sealing within the stack.

Preferably the oxidant channels 720 are approximately the same length. This can result in the central opening 785 being non-circular, as in the embodiment shown in FIG. 7a. In other embodiments the plates could be non-circular with a circular central opening. In other embodiments, both the plate and the central opening are circular, and the channels on the anode side of the plate have substantially the same length and/or the shape of the active area of the MEA corresponds to the region with channels.

Figure 7B:
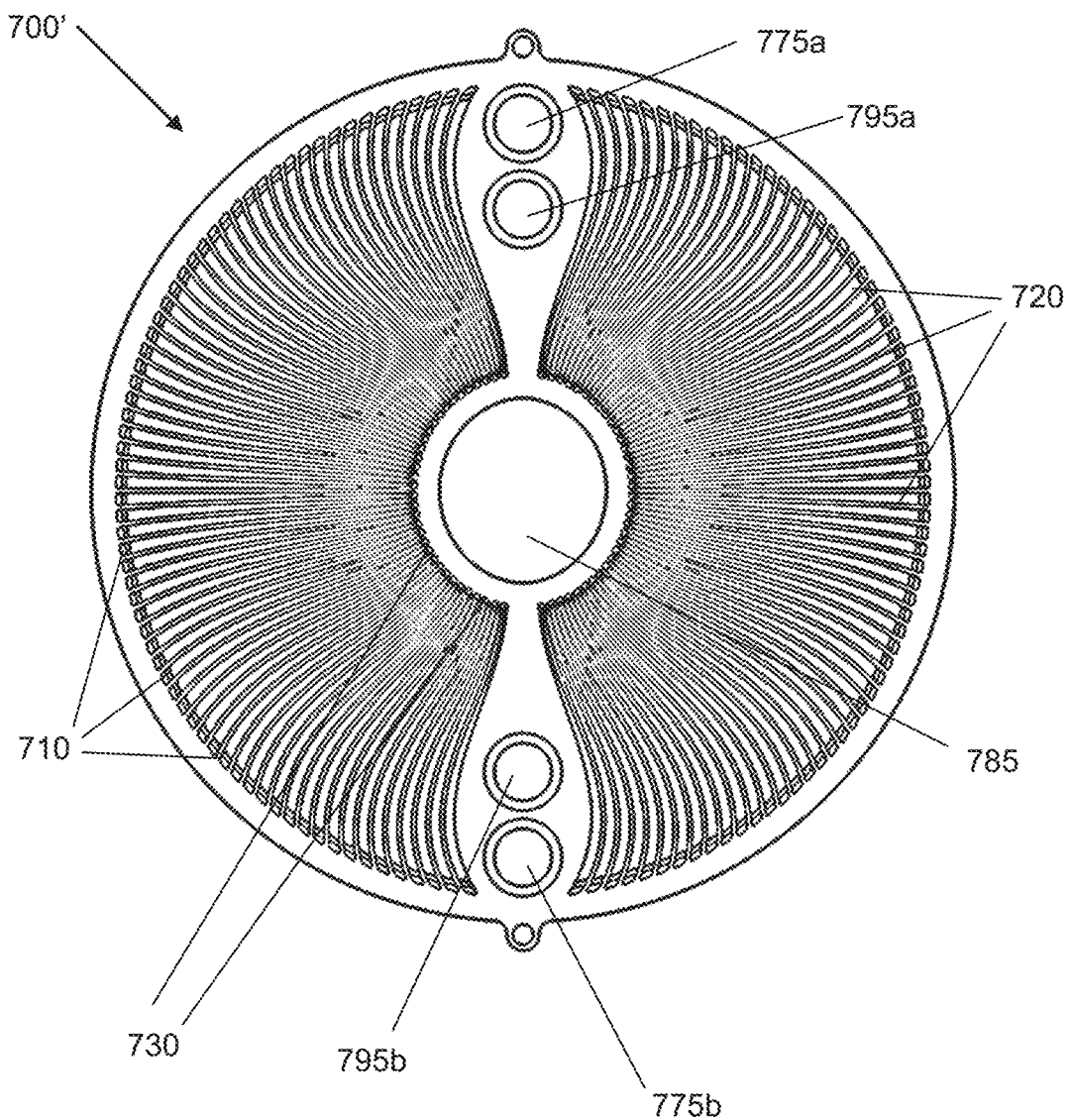
FIG. 7b is a plan view of an annular cathode flow field plate with a pair of internal coolant manifold openings, in addition to a pair of fuel manifold openings.

FIG. 7b shows a plan view of a similar cathode flow field plate 700' but with an additional pair of internal coolant manifold openings 795a and 795b.

Figure 8:
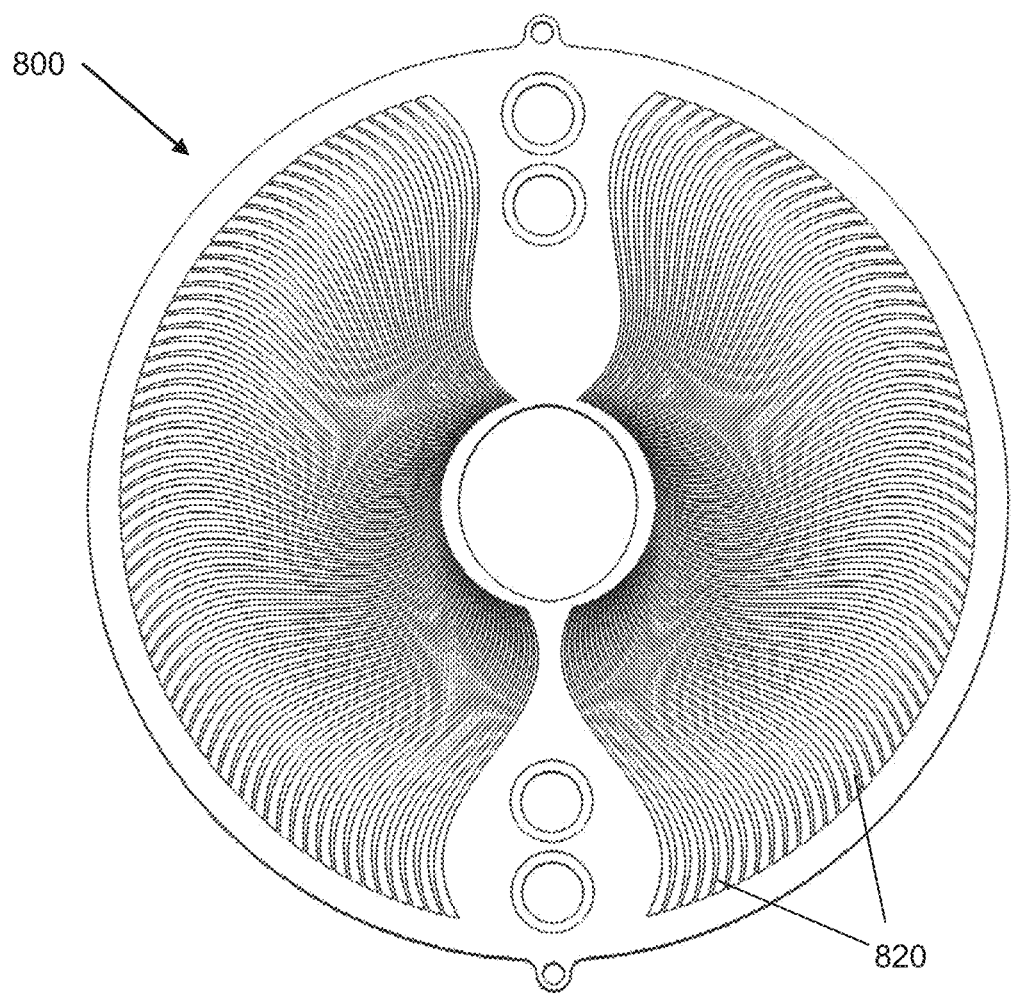
FIG. 8 is a plan view of an alternative embodiment of an annular cathode flow field plate.

FIG. 8 shows a plan view of an alternative embodiment of a cathode flow field plate 800. The plate again employs channels 820 with exponentially decreasing width (from inlet to outlet), however the channels have wavy sides and take a longer, more tortuous route from the perimeter to the center of the plate.

Figure 9:
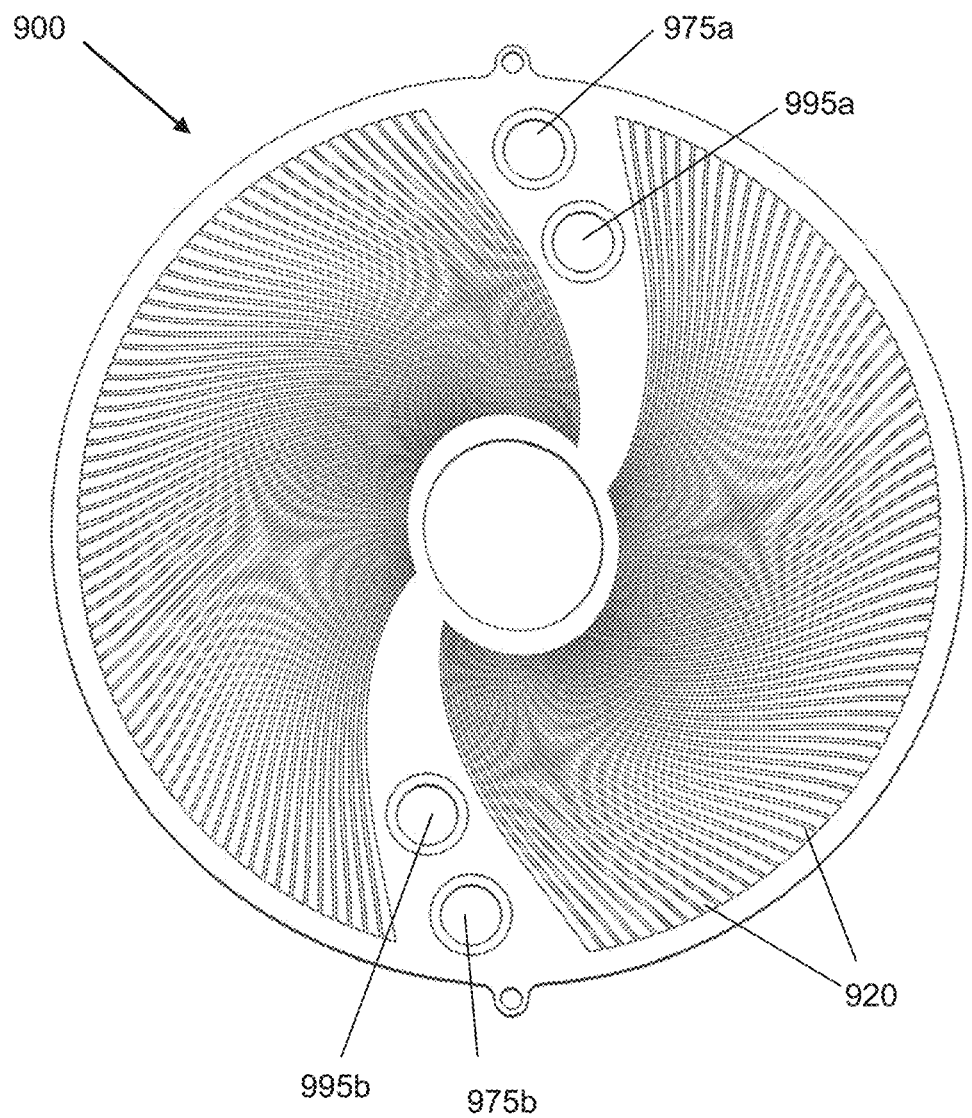
FIG. 9 is a plan view of another alternative embodiment of an annular cathode flow field plate.

FIG. 9 shows a plan view of another alternative embodiment of a cathode flow field plate 900. The plate again employs channels 920, all of approximately the same length, with exponentially decreasing width (from inlet to outlet), but the channels are arranged in a spiral pattern with a pair of gaps to accommodate the fuel manifold openings 975a, 975b and coolant manifold openings 995a, 995b.

Figure 10:
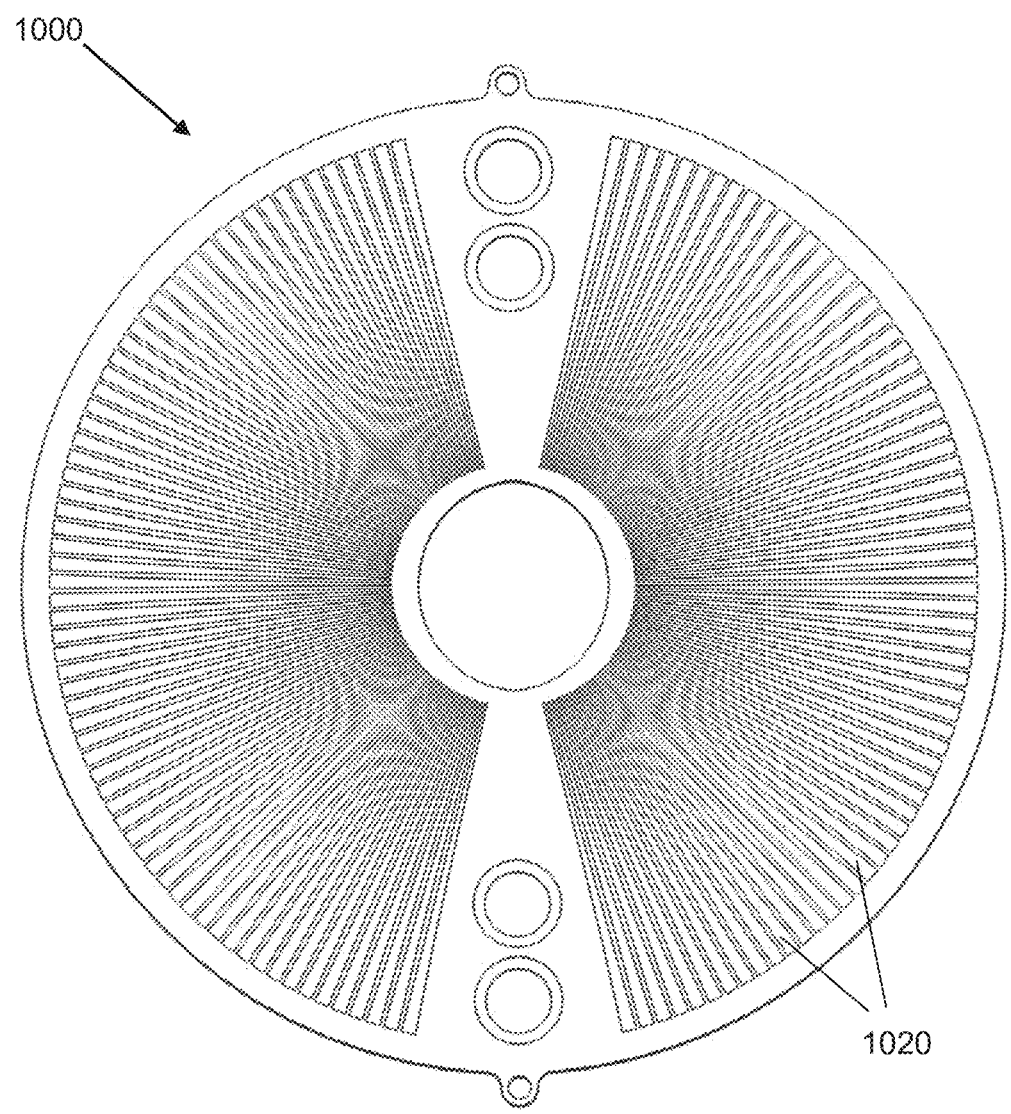
FIG. 10 is a plan view of another alternative embodiment of an annular cathode flow field plate.

FIG. 10 shows a plan view of another alternative embodiment of a cathode flow field plate 1000. In this embodiment the plate again employs channels 1020 with exponentially decreasing width (from inlet to outlet), but this time the channels are straight and the land width between channels gets wider towards the center of the plate.

In other embodiments, the oxidant channels do not exponentially decrease in width for example, the oxidant channels can be straight-sided and trapezoidal, narrowing linearly from inlet to outlet.

Anode Flow Field

Figure 11:
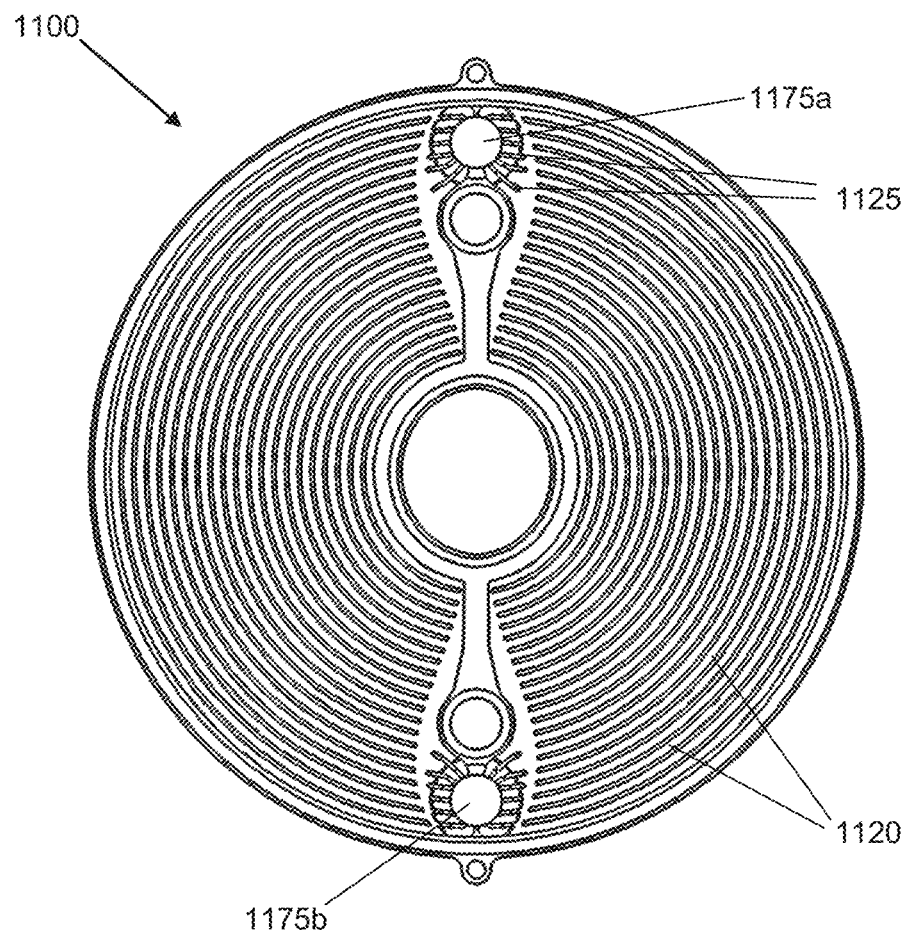
FIG. 11 is a plan view of an annular anode flow field plate.

FIG. 11 shows a plan view of an annular anode flow field plate 110. In the illustrated embodiment the anode flow field is concentric pattern of approximately semi-circular channels 1120 extending between a fuel inlet manifold opening 1175a and a diametrically opposed fuel outlet manifold opening 1175b within plate 1120. Rib features 1125 are provided around the inlet opening to direct the fuel towards the channels 1120. When used in combination with a generally radial cathode flow field such as illustrated in FIGS. 7-10, the relative cross-flow configuration of fuel channels to oxidant channels provides good mechanical support for the MEA.

Preferably the fuel channel lengths from inlet to outlet are approximately the same so that there is no preferential path for the fuel stream from the inlet to the outlet. Rib features 1225 can help to divert flow to compensate for differences in channel length. However, other anode flow field designs besides that illustrated in FIG. 11 can be used. For example, the anode flow field can comprise channels in which the channel cross-sectional area varies along the length of the channel. In some embodiments, the width of the channels can decrease according to a natural exponential function, as described above for the cathode.

Coolant Flow Field

As mentioned above, in some embodiments of the present fuel cell stack there are coolant channels between some or all of the pairs of fuel cells in the stack. These coolant channels can be formed on the back of the anode plate, or the back of cathode plate, or between the adjacent surfaces of the two plates. Coolant can be supplied/exhausted via manifold openings within the plates and MEAs. Such embodiments are particularly suitable when a liquid coolant is to be used.

FIG. 12 shows a plan view of the reverse side of the cathode plate 700' shown in FIG. 7b, showing a coolant flow field. In the illustrated embodiment, the coolant flow field is also a concentric pattern of approximately semi-circular channels 1220 extending between a coolant inlet manifold opening 795a and a diametrically opposed coolant outlet manifold opening 795b within plate 700'. Again, rib features 1225 are provided around the coolant inlet opening to direct the coolant towards the channels 1220. In the fuel cell stack, the illustrated surface of the coolant plate is adjacent to the back of the anode flow field plate.

FIG. 12 shows where the oxidant enters at periphery of the fuel cell stack via slots 1210 on the coolant side of the plate 700', and then passes through the plate to the other side via holes 710 in the circumferential portion of the plate, each leading to one of the oxidant channels 720 on the other side. After traversing the oxidant channels on the other side as shown in FIG. 7b, the oxidant passes back through the plate to the coolant side via holes 730 in the plate and exits into the central exhaust manifold opening 785 via short slots or grooves 1230.

In the above-described cylindrical fuel cell stacks, the reactant and coolant flow field plates can be made of suitable materials or combination of materials, and can be fabricated by various methods. For example the plates can be made from graphite, graphite foil, electrically conductive composite materials, metals or other suitable materials. The plates can be formed by injection molding, milling, embossing, stamping, deposition or other suitable techniques for forming the patterned plates. In embodiments with embossed metal reactant plates, the coolant flow field can be provided on the back of the reactant plate and can be the inverse channel pattern.

Membrane Electrode Assembly (MEA)

Figure 13A:
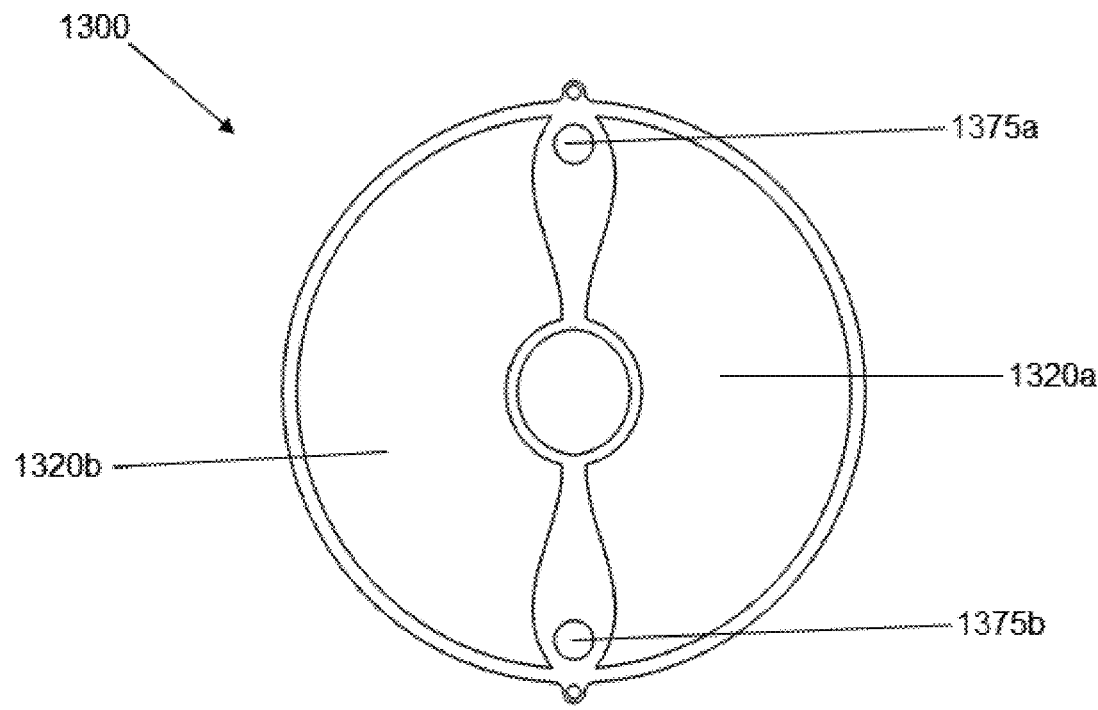
FIG. 13a is a plan view of an annular membrane electrode assembly (MEA) with a pair of fuel manifold openings.
Figure 13B:
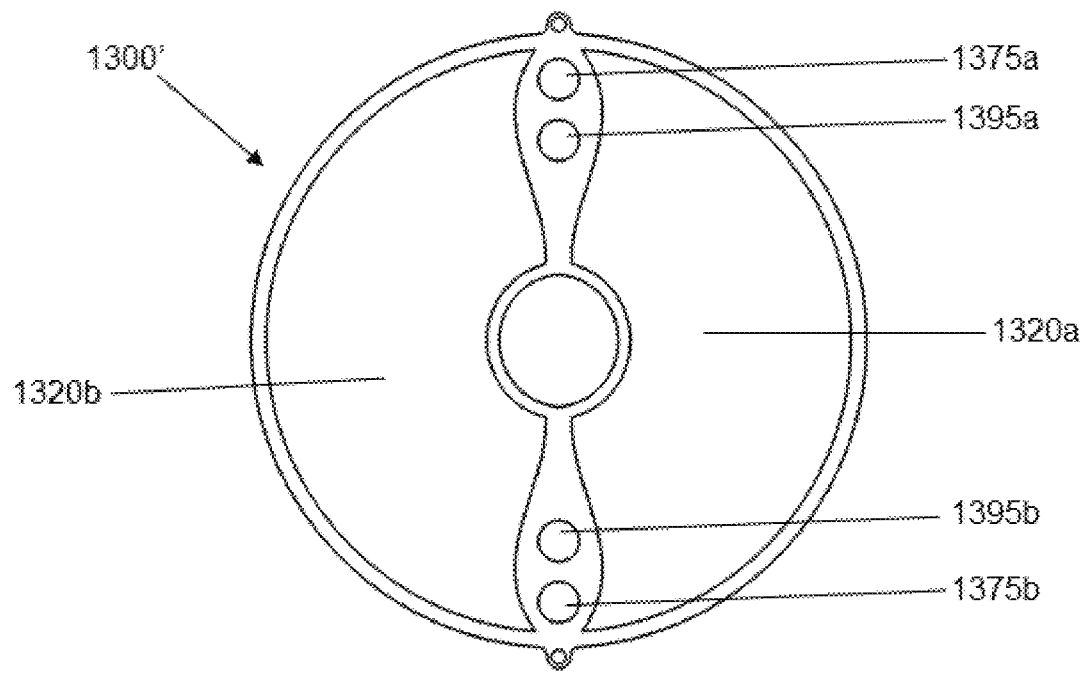
FIG. 13b is a plan view of an annular membrane electrode assembly (MEA) with a pair of internal coolant manifold openings, in addition to a pair of fuel manifold openings.

FIGS. 13a and 13b show a plan view of examples of the annular membrane electrode assemblies (MEA) that can be used in a cylindrical fuel cell stack such as illustrated in FIG. 1. FIG. 13a shows an MEA 1300 with openings 1375a and 1375b for fuel inlet and outlet manifolds. The MEA 1300' shown in FIG. 13b has an additional pair of openings 1395a and 1395b for coolant inlet and outlet manifolds. The MEAs have two separate active areas 1320a and 1320b (these active areas comprise catalyst and are electrically conductive), although in other embodiments these areas can be joined as one. It can be seen that the active area(s) extend over most of the area of the unit cell which increases the overall power density of the stack.

MEAs for PEM fuel cells comprise a proton conducting membrane sandwiched between a pair of electrodes (anode and cathode). The electrodes each comprise a catalyst layer that is in contact with the membrane electrolyte, and can further comprise one or more layers of a porous electrically conductive material, such as a carbon sublayer, carbon fiber paper and carbon cloth. A wide range of membranes, catalysts and other materials are known for use in PEM fuel cells. MEAs can be formed using a variety of known fabrication processes, for example, in some cases a catalyzed membrane is sandwiched between a pair of porous, electrically conductive layers, whereas in others the catalyst is applied to a porous, electrically conductive sheet material. The MEA can be pre-formed as a unitary structure or the various MEA components can be placed between the flow field plates separately. The MEA can further comprise gaskets or seals as is well-known in the art.

The above-described cylindrical fuel cell stacks, can employ suitable MEA compositions and structures.

Sealing

Sealing is simplified in the cylindrical stack architecture. O-ring gaskets (made from suitable resilient gasket materials that are compatible with the fuel cell) can be used for most if not all of the seals between the plates and MEAs.

Stack Compression

With the above described cylindrical stack architecture, the stack components can be held together and compressed using conventional fuel cell stack compression mechanisms. For example, one or more internal or external tie rods, or compression straps, or a ratchet mechanism, can be used in combination with a pair of rigid end plates and one or more Belleville washers or other resilient springs, or a compression bladder. It is generally easier to apply a compressive force that is distributed evenly across the plane of the individual fuel cells with a cylindrical stack than with a rectangular fuel cell stack, because of the axial symmetry of the cylindrical stack.

Figure 14A:
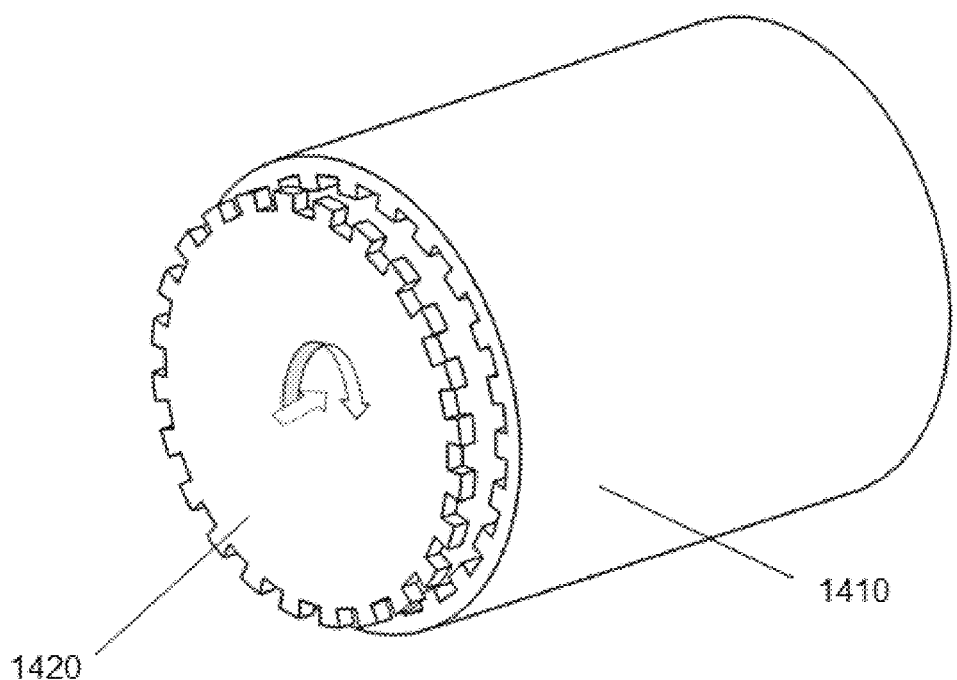
FIG. 14a is a perspective view in cross-section of a fuel cell power module comprising a cylindrical fuel cell stack, which illustrates the insertion of a toothed end-plate into a housing to compress the fuel cell stack contained within the housing.
Figure 14B:
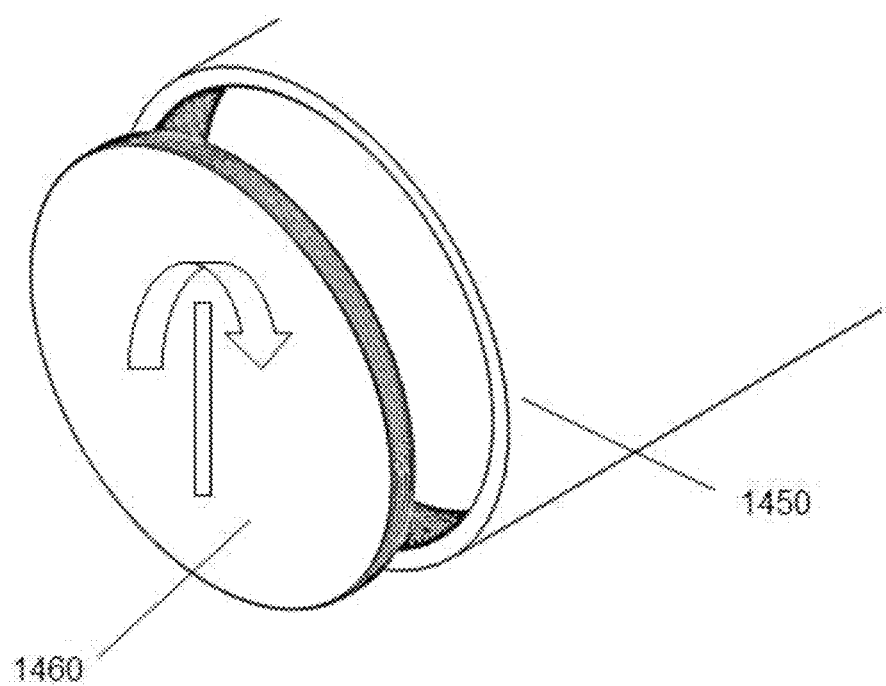
FIG. 14b is a perspective view in cross-section of a fuel cell power module comprising a cylindrical fuel cell stack, which illustrates the screwing of a threaded end-plate into a housing to compress the fuel cell stack contained within the housing.

The presence of the housing opens up some other options for compression of the fuel cell stack besides conventional tie-rods or straps. In the fuel cell power module illustrated in FIG. 1, both end-plates 160 and 165 are secured to the interior wall of housing 110. For example, plate 160 is secured by means of a set of brackets, and plate 165 is welded or otherwise directly attached to the interior wall. A resilient device is interposed between at least one of the end-plates and the stack to provide resilient compressive force. FIGS. 14a and 14b illustrate another two examples of how the housing can be utilized in fuel cell stack compression.

FIG. 14a shows a how an end-plate 1420 could be inserted at one or both ends of a housing 1410 to compress a fuel cell stack contained within the housing. The end-plate is inserted by lining up the teeth with corresponding openings between teeth in the housing, external axial compressive is force applied to the plate to push it into the housing beyond the housing teeth, and then the plate is twisted so that it is secured in place by the teeth. FIG. 14b shows a how a threaded end-plate 1460 could be used at one or both ends of a housing 1450 to compress a fuel cell stack contained within the housing. The inside wall of the housing 1450 is threaded so that a threaded end-plate can be screwed into place, thereby applying compressive force to the stack within.

In both of these examples, the compression mechanism would generally comprise other components in addition to the end-plate(s) and housing shown. For example:

(a) one or more resilient devices could be inserted between the end-plate and the stack to provide resilient compressive force, for example, springs, bladders or gel-pads or other such devices could be used;

(b) seals can be incorporated;

(c) suitable mechanisms can be used to hold the stack components together and in alignment when the end-plate or other elements of the compression mechanism are not in place.

Air-Cooled Fuel Cell Stacks

As mentioned above, in some embodiments, the fuel cell stack is cooled with a liquid coolant which is directed through coolant flow field channels between some or all of the adjacent pairs of fuel cells in the stack. In other embodiments the stack is air-cooled. In some air-cooled embodiments a separate air supply (from the reactant air) is provided to direct cooling-air through coolant channels within the stack. In other air-cooled embodiments, the oxidant air passing though the cathode flow field provides sufficient cooling without the need for separate coolant channels in the stack. In further embodiments, fins can extend from the perimeter of the plates (protruding beyond the active area) for passive heat dissipation.

In other air-cooled embodiments, the same source of incoming air is used as both the oxidant and the coolant, but the air stream is split so that some of the incoming air flows through the cathode flow field channels, and some of it flows between pairs of cathode and anode plates (as in the stack illustrated in FIGS. 1 and 3). The cathode exhaust and cooling air are recombined in the central oxidant exhaust manifold and exit the stack. Gaps or cavities are provided between adjacent fuel cells for the cooling-air. The cavities can contain spacers, ribs, channels or other features to direct the cooling-air flow and/or support the plate. Dampers or other adjustment mechanisms can be used to regulate the oxidant air flow through the cathode flow field channels, the cooling air flow between plates and/or to adjust the ratio.

Figure 15A:
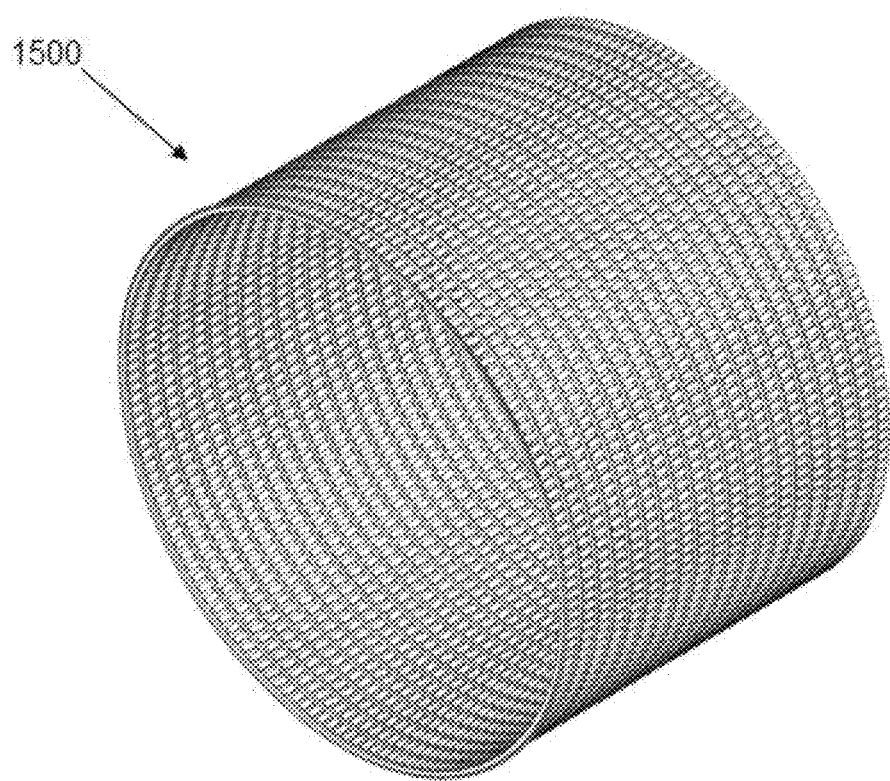
FIG. 15a is a perspective view in cross-section of a fuel cell power module comprising a cylindrical fuel cell stack, which illustrates the installation of a mesh sleeve to surround the cylindrical fuel cell stack contained within a housing.
Figure 15B:
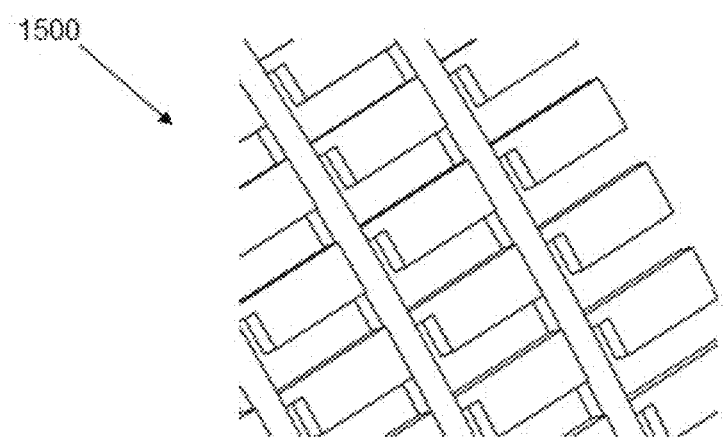

FIG. 15a shows an example of a mesh sleeve 1500 which can be installed to surround a cylindrical fuel cell stack contained within a housing, such as described above. FIG. 15b shows a close-up view of the mesh material of sleeve 1500. The mesh sleeve 1500 can be rotatable (either manually or using some other device) to control the degree to which the inlets to the cathode flow fields, and access to the cooling-air cavity between cells, at the periphery of the stack is obstructed. This allows adjustment of the oxidant air and cooling-air flow through the stack.

The exhaust air can be used in a forced air combined heat and power (CHP) system.

Alternative Fuel Cell Stack Architectures

Although cylindrical fuel cell stacks such as those described above offer some advantages, there can be significant material wastage during manufacturing of disc shaped or circular stack components from rectangular sheet materials (for example, rolled goods or flat sheets material). Generally shapes that nest most efficiently on a rectangular sheet material include triangles, squares, rectangles, parallelograms, half hexagons, and more complex geometries. Components with these shapes can be cut from a sheet material or roll of material with little or no material wastage, generally resulting in a lower cost for the components. One or more stacks with these architectures can be contained within a cylindrical housing. The plenum formed by the difference in geometry shape and size between the fuel cell stack and the inner wall of the housing can be used as a cathode manifold. This plenum does not have to be annular. Thus, conventional square or rectangular stack architectures can be used in a power module with a cylindrical housing as described herein. Alternatively, stacks based on a hexagonal unit cell can be used, and can readily be accommodated into a cylindrical housing.

Figure 16:
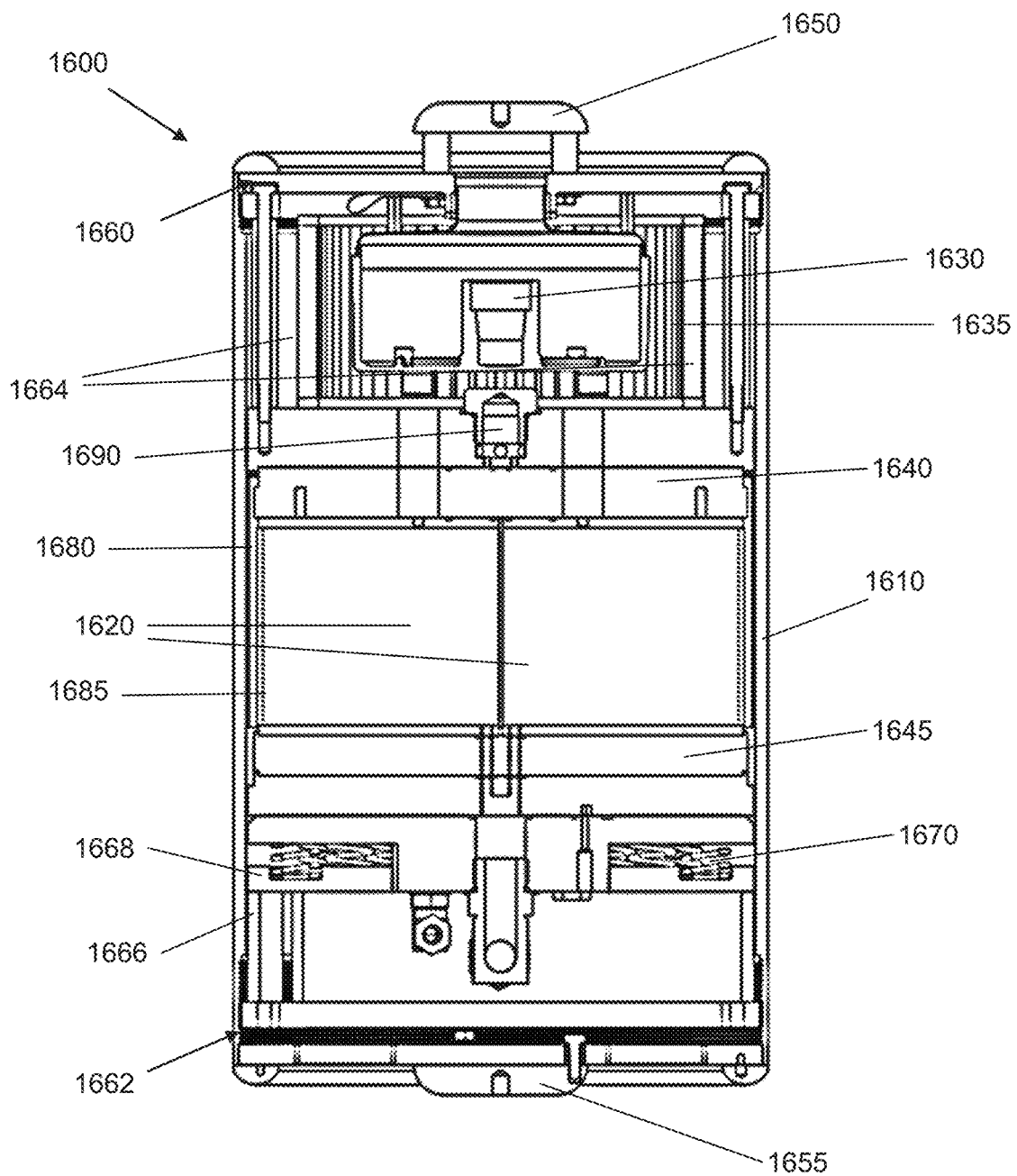
FIG. 16 is a cross-sectional view of an alternative embodiment of a fuel cell power module comprising a pair of fuel cell stacks, based on a hexagonal architecture, integrated with other system components within a cylindrical housing.
Figure 17A:
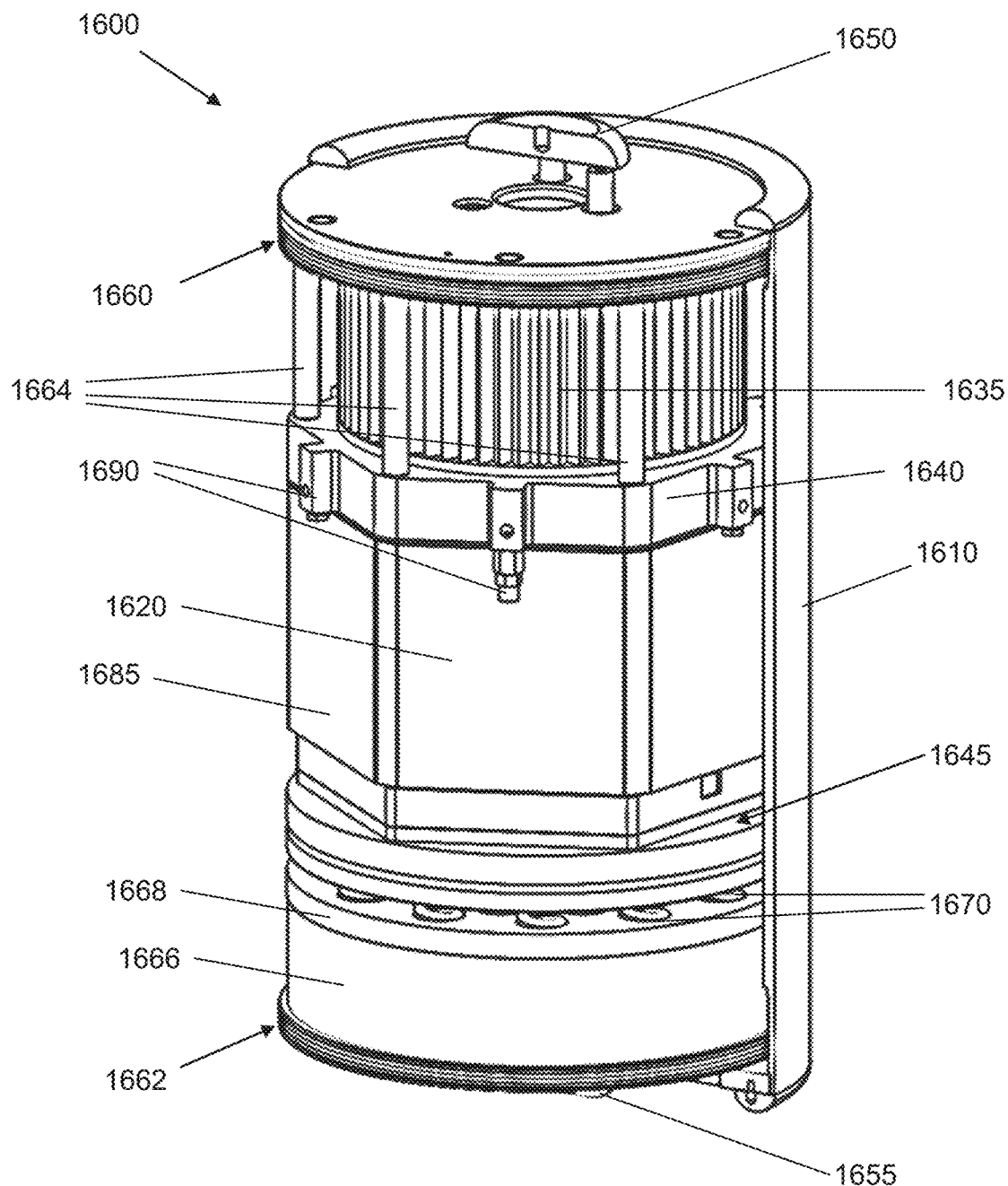
FIG. 17a is a three-dimensional, partially cut away view of the fuel cell power module of FIG. 16.
Figure 17B:
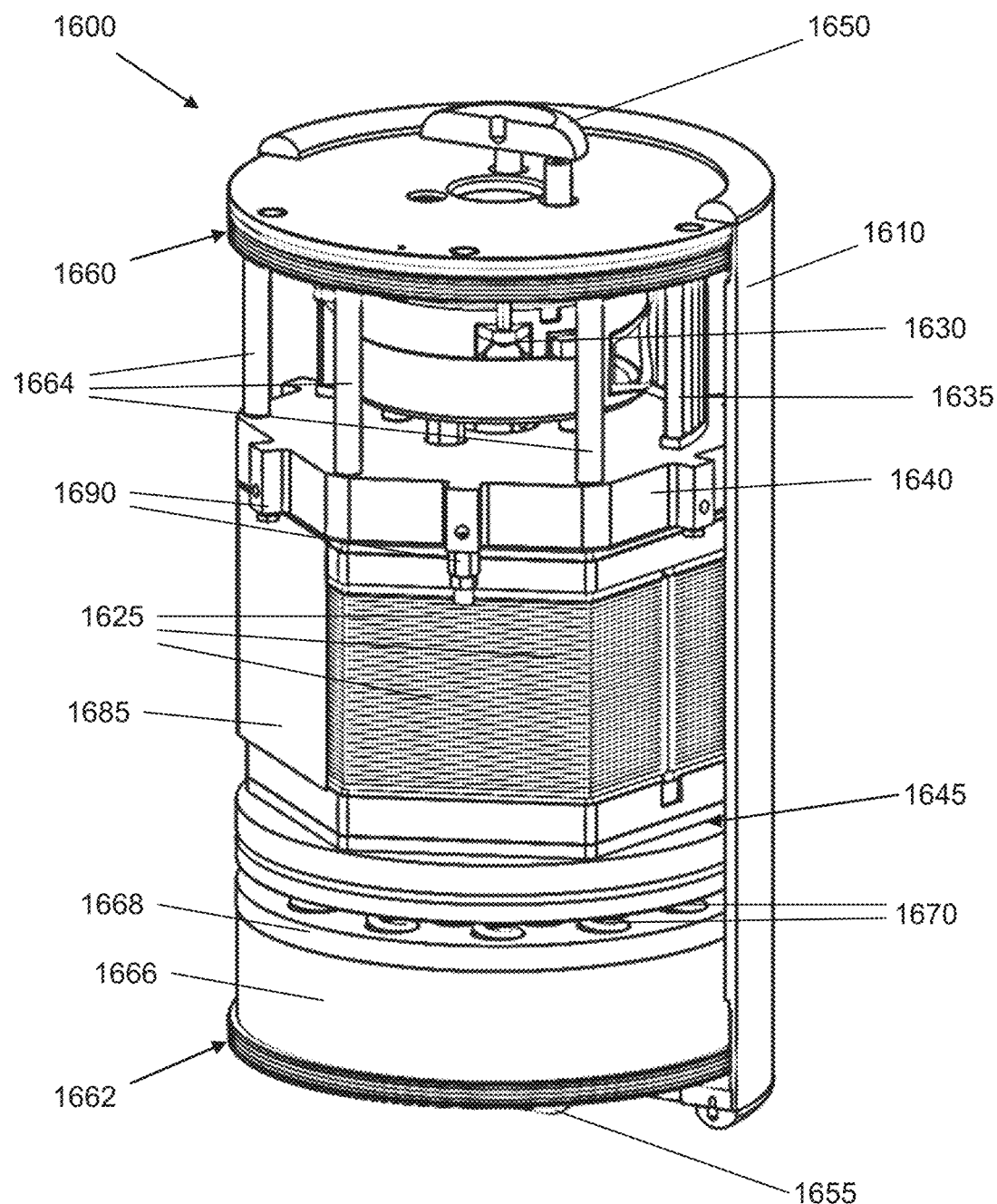
FIG. 17b is another three-dimensional, partially cut away view of the fuel cell power module of FIG. 16.

For example, FIG. 16 is a cross-sectional view, and FIGS. 17a and 17b are three dimensional, partial cut away views, of an alternative embodiment of a fuel cell power module 1600 comprising two fuel cell stacks that are based on a hexagonal architecture. The stacks (each made up of a plurality of 5 sided, half hexagonal unit cells) are integrated with each other, and with additional system components within a cylindrical housing. Power module 1600 and its components are similar in many respects to the power module shown in FIGS. 1, 2a and 2b.

Referring to FIGS. 16, 17a and/or 17b, fuel cell power module 1600 comprises a cylindrical plastic housing 1610. Housing 1610 contains a pair of fuel cell stacks 1620, each comprising multiple unit cells 1625. The stacks can be electrically connected to each other in series or in parallel. Housing 1610 also contains an axially mounted blower 1630 for supplying air to the fuel cell cathodes, and an air filter 1635. The fuel cell stacks 1620 are interposed between fluid manifold/distribution plates 1640 and 1645. Positive and negative electrical terminals 1650 and 1655 protrude from each end of power module 1600, and can be used to connect the power module to other modules or to an electrical load. A compression assembly compresses stacks 1620 between fluid manifold/distribution plates 1640 and 1645. The compression assembly comprises a pair of threaded compression rings (or annular plates) 1660 and 1662 that are screwed into threaded inside walls each end of the housing, to apply compressive force to the stacks. A plurality of circumferentially located load transfer posts 1664 transmit compressive force to fluid manifold/distribution plate 1640. The compression assembly further comprises a compression load transfer ring 1666, and a spring seat plate 1668 which has recesses to accommodate a plurality of springs 1670 which are compressed between spring seat plate 1668 and fluid manifold/distribution plate 1645.

The routing of the air and fuel streams through the stacks is similar to as described above for power module 100. Again, a space or plenum 1680 (visible in FIG. 16) located between fuel cell stacks 1620 and the inner wall of housing 1610 serves as an oxidant inlet manifold. In module 1600, the annular plenum 1680 is divided by a thin, six-sided (or cylindrical) baffle 1685 which surrounds fuel cell stacks 1620. Blower 1630 directs an air stream down and into the space between the inner wall of housing 1610 and baffle 1685. The air stream then flows up between baffle 1685 and the outer faces of fuel cell stacks 1620 and enters the fuel cell cathode flow field channels. It flows generally radially towards the central axis of the module 1600 where it exits the channels into a central oxidant exhaust manifold.

Module 1600 has an integrated evaporative cooling and humidification assembly for cooling the stacks 1620 and humidifying the oxidant stream prior to it entering stacks 1620. Module 1600 can comprise a reservoir of water (not shown) located at the base of housing 1610 around plate 1645 (similar to reservoir 618 shown in FIG. 6). Water can be circulated from the reservoir through coolant channels (described below) in stacks 1620 by a small pump (not shown), picking up heat from the electrochemical reaction and moderating the fuel cell stack temperature. The resulting warm, pressurized water is then directed via fluid manifold/distribution plate 1640 to a circular array of six spray nozzles 1690 which spray atomized water into the oxidant stream as it flows between the inner wall of housing 1610 and baffle 1685. The space between the inner wall of housing 1610 and baffle 1685 serves as a mixing zone for humidification of the air as the two fluids flow towards the bottom of the manifold. Baffle 1685 can stop short of the surface of the reservoir at the bottom to allowing the humidified air stream to reverse direction and flow up between baffle 1685 and the outer faces of fuel cell stacks 1620 and into the cathode flow channels. This can act as a liquid water knockout so that fuel cells 1620 are provided with humidified air and reduced or minimal entrained liquid water droplets.

In this humidification technique the vaporization of the water serves to cool the injected water, because of the energy associated with latent heat of vaporization. This effectively cools the stack, as the cooled water enters the reservoir and then enters the coolant circuit to cool the stack.

The coolant for this system should be deionized water or of suitable quality for entering the fuel cell cathode. This system should also generally have a filter to maintain water quality.

Figure 18A:
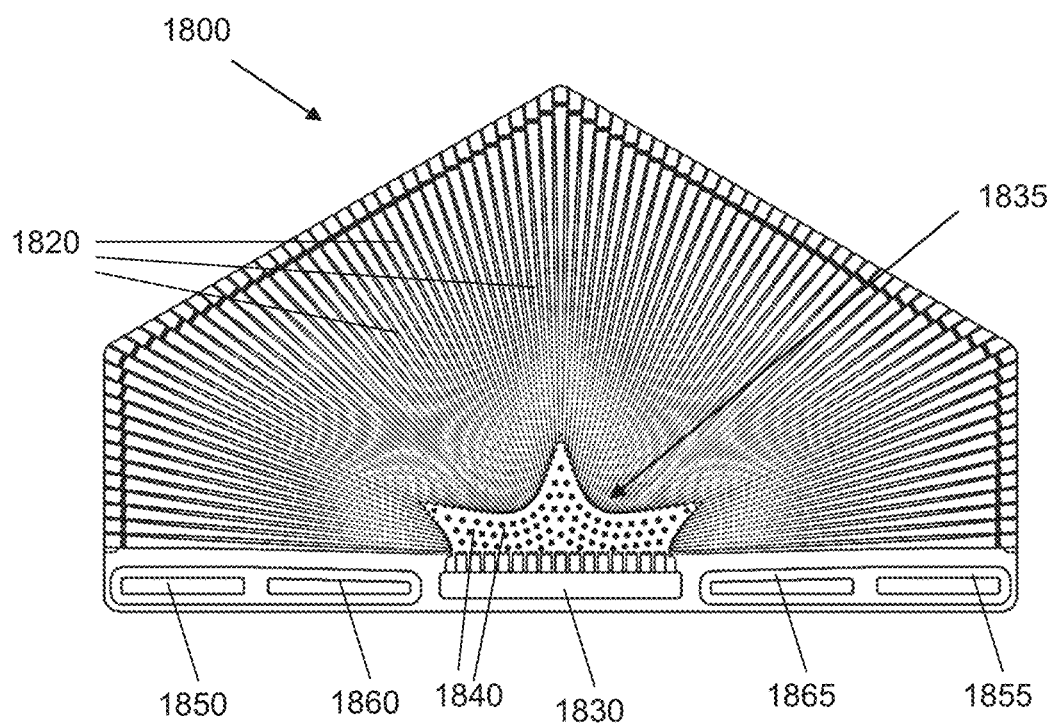
FIG. 18a is a plan view of one side of a cathode flow field plate used in the power module of FIG. 16, showing the oxidant flow channels.

FIG. 18a shows a plan view of the oxidant side of a cathode flow field plate 1800 used in the stacks 1620 of power module 1600. Cathode flow-field plate 1800 is in the shape of a half-hexagon. It is an open cathode design; therefore there is no seal around the periphery of the oxidant side of the plate. Air enters channels 1820 at the outer periphery of the plate and flows along the channels towards the center of the plate, exiting the channels into oxidant exhaust manifold opening 1830. The flow channels 1820 have an exponentially decreasing width for maintaining uniform oxygen availability along the length of the channel. The depth of the channels is substantially constant along their length. The width of the ribs or landing areas between the channels 1820 vary in width accordingly. Each channel 1820 is of substantially equal length to improve the flow sharing characteristics of the flow field. The result of this is a star shaped feature 1835 in the region of the oxidant channel outlets. Rib-dots or posts 1840 are provided in this outlet region to help support the adjacent MEA (not shown). Plate 1800 also comprises fuel supply and exhaust manifold openings 1850 and 1855, and coolant supply and exhaust manifold openings 1860 and 1865. These openings are surrounded by suitable seals or bridges on the oxidant side of cathode flow field plate 1800.

Figure 18B:
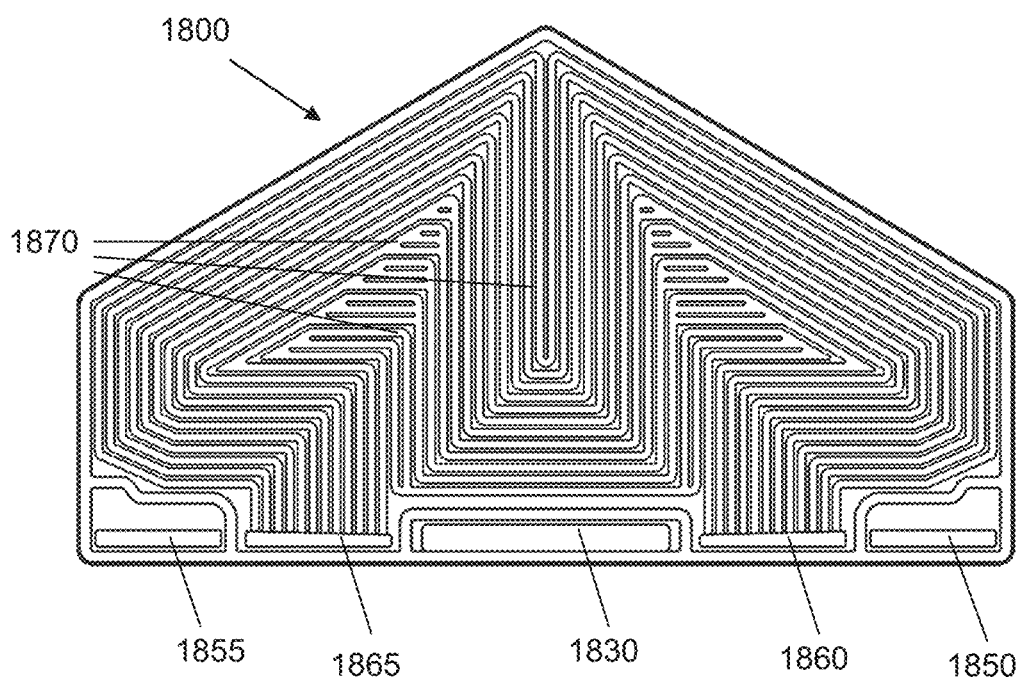
FIG. 18b is a plan view of the other side of the cathode flow field plate FIG. 18a, showing the coolant flow channels.

FIG. 18b shows a plan view of the coolant side of the cathode flow field plate 1800 of FIG. 18a, showing serpentine coolant flow channels 1870 which direct coolant flow across the plate 1800 from coolant supply manifold opening 1860 to exhaust manifold opening 1865. Coolant can flow in either direction. In the illustrated embodiment, the coolant flow field is on the reverse side of cathode flow field plate 1800. It could, however, be located on the reverse side of the anode flow field plate shown below. The illustrated flow channels are serpentine, but are not limited to this configuration.

Figure 19A:
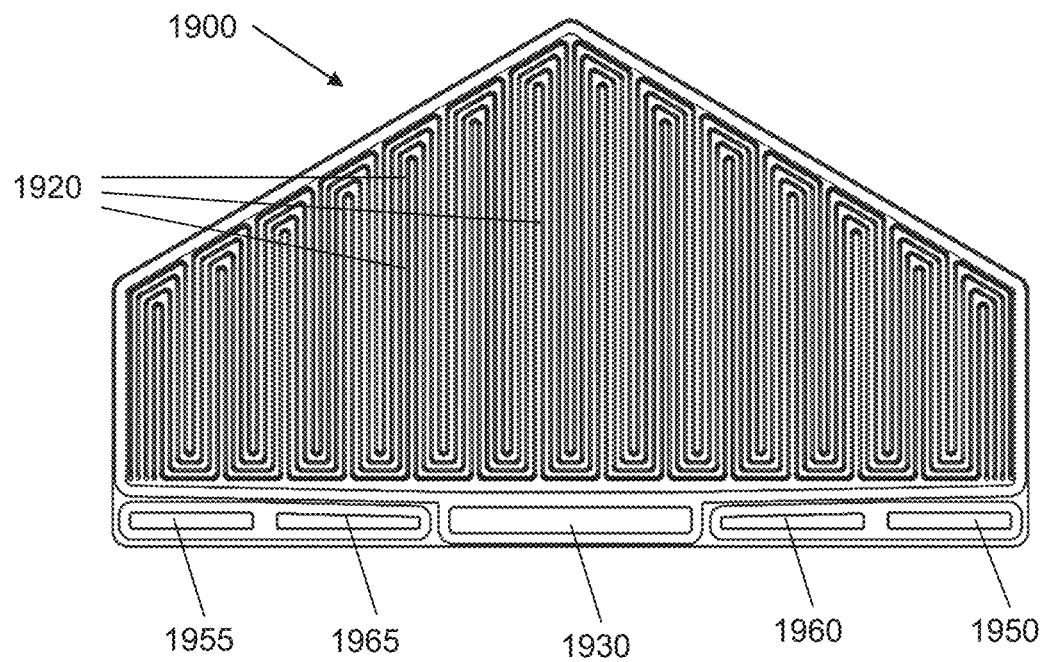
FIG. 19a is a plan view of one side of an anode flow field plate used in the power module of FIG. 16, showing the fuel flow channels.

FIG. 19a shows a plan view of the fuel side of an anode flow field plate 1900 used in the stacks 1620 of power module 1600 of FIG. 16, showing serpentine fuel flow channels 1920. Anode flow-field plate 1900 is in the shape of a half-hexagon. Fuel enters four serpentine channels 1920 via fuel supply manifold 1950 from the other side of the plate 1900 via small through-openings or holes (1990 visible in FIG. 19b) formed in the inlet portion of the plate. When the fuel reaches the end of each channel 1920, it passes back through holes in the plate (1995 visible in FIG. 19b) to the other side and exits into fuel exhaust manifold opening 1955. This approach of using the other side of the plate for reactant access/discharge to and from the channels simplifies the sealing within the stack. Plate 1900 also comprises coolant supply and exhaust manifold openings 1960 and 1965, and oxidant exhaust manifold opening 1930. Manifold openings 1930, 1950, 1955, 1960 and 1965 are surrounded by suitable seals or bridges on the fuel side of anode flow field plate 1900. When plates 1800 and 1900 are stacked, the corresponding oxidant, fuel and coolant manifold openings in the plates and MEAs align to form manifolds that extend through the stack.

Figure 19B:
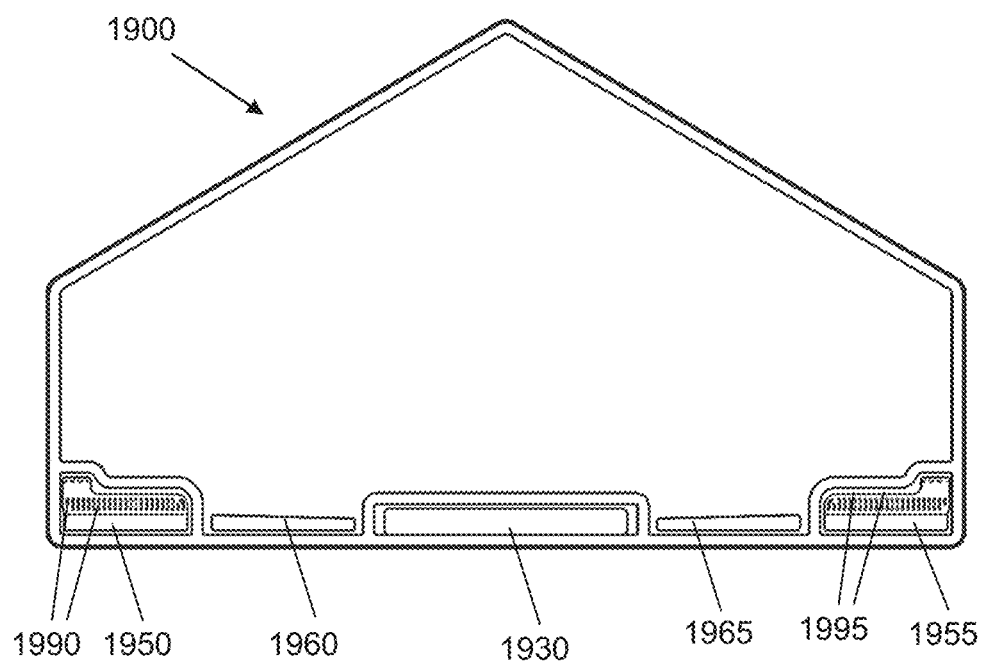

FIG. 19b shows a plan view of the coolant side of the anode flow field plate 1900 of FIG. 19a. In stacks 1620 this side of anode plate 1900 is adjacent to the coolant side of cathode flow field plate 1800 illustrated in FIG. 18b. Through-holes 1990 and 1995 via which the fuel access fuel flow channels 1920 on the other side of plate 1900 are shown. A suitable seal extends around the periphery of the anode flow field plate 1900 and around manifold openings 1930, 1950 and 1955, on the coolant side of the plate.

Instead of the half-hexagonal plates and stacks of fuel cell power module 1600, the fuel cell stacks (plates and other stack components) can be segmented into triangular wedges. Six individual stacks could then be placed in the same housing, and electrically connected in various series or parallel combinations as desired. By connecting six stacks in series, a higher voltage can be produced which is advantageous for some applications.

Balance of Plant Module

In the above described integrated power modules, balance of plant components are contained and integrated with one or more fuel cell stacks within a housing. In some applications it can be desirable to have some or all of the balance-of-plant components necessary for an operational fuel cell system contained within a housing, but for use with one or more external fuel cell stacks (in some cases without having a fuel cell stack within a housing). For example, a balance of plant module can comprise a housing enclosing a humidification assembly such as described above, filters, fans or pumps, sensors, a control board and fuel source.

Operational Aspects

Generally the fuel used will be substantially pure hydrogen and the oxidant is oxygen from air that is supplied to the stack, although other fuels and oxidant streams can be used with the fuel cell stacks and power modules of the present architecture.

Although most of the above-described fuel cell stacks and modules can be used and operated in various orientations, having the stack oriented with the longitudinal axis vertically and the oxidant exhaust located at the lower end can assist with water drainage (by gravity), reducing the tendency for pooling of liquid water and in some cases enhancing freezability of the system.

Where a component is referred to above, unless otherwise indicated, reference to that component should be interpreted as including as equivalents of that component any component which performs the function of the described component (namely, one that is functionally equivalent), including components which are not structurally equivalent to the disclosed structure which performs the function in the illustrated exemplary embodiments.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A proton exchange membrane fuel cell power module comprising:
   (a) a cylindrical housing having an interior surface;
   (b) a fuel cell stack contained within said cylindrical housing, said fuel cell stack comprising a plurality of fuel cells interposed between a pair of compression end-plates, each of said fuel cells comprising an anode and an anode flow field plate, a cathode and a cathode flow field plate, and a proton conducting membrane electrolyte interposed between said anode and said cathode;
   (c) a humidifier contained within said cylindrical housing; and
   (d) an air supply configured to direct air to said plurality of fuel cell cathode flow field plates via said humidifier and via a plenum defined by a space between said fuel cell stack and said interior surface of said cylindrical housing.

2. The proton exchange membrane fuel cell power module of claim 1, wherein said humidifier is a bubbler humidifier.

3. The proton exchange membrane fuel cell power module of claim 1, wherein said humidifier comprises a reservoir containing water, wherein said reservoir is located within said plenum.

4. The proton exchange membrane fuel cell power module of claim 3 wherein said fuel cell stack is cylindrical.

5. The proton exchange membrane fuel cell power module of claim 4, wherein said plenum serves as an oxidant supply manifold, and wherein said air supply is configured to direct air into said plenum and in contact with said water in said reservoir such that said air is humidified and then
   (i) enters said plurality of cathode flow field plates;
   (ii) flows substantially radially through said plurality of cathode flow field plates; and
   (iii) exits said fuel cell stack via a central oxidant exhaust manifold.

6. The proton exchange membrane fuel cell power module of claim 4, wherein said plenum serves as an oxidant supply manifold and is divided by a baffle, and wherein said air supply is configured to direct air into said plenum such that said air
   (i) flows between said interior surface of said cylindrical housing and an outer wall of said baffle in a first substantially axial direction;
   (ii) contacts said water in said reservoir such that said air is humidified;
   (iii) flows between an inner wall of said baffle and said fuel cell stack in a second substantially axial direction, wherein said second substantially axial direction is opposite to said first substantially axial direction;
   (iv) flows substantially radially through said plurality of cathode flow field plates; and (v) exits said fuel cell stack via a central oxidant exhaust manifold.

7. The proton exchange membrane fuel cell power module of claim 4, further comprising a layer of diffusive media at least partially submerged in said water in said reservoir.

8. The proton exchange membrane fuel cell power module of claim 5, further comprising a water collection system for recovering water from air flowing; in said oxidant exhaust manifold and directing said recovered water to said reservoir.

9. The proton exchange membrane fuel cell power module of claim 4, further comprising:
   (e) a plurality of coolant pathways, each of said pathways disposed between an adjacent pair of said plurality of fuel cells, wherein said coolant pathways are fluidly connected to said reservoir; and
   (f) a coolant circulation system configured to circulate said water from said reservoir through said coolant pathways.

10. The proton exchange membrane fuel cell power module of claim 9, wherein said humidifier further comprises a plurality of nozzles fluidly connected to receive said water exiting said coolant pathways, wherein said coolant circulation system is configured to spray water exiting said coolant pathways into said plenum via said plurality of nozzles to humidify air flowing through said plenum.

11. The proton exchange membrane fuel cell power module of claim 1, further comprising:
   (e) a fuel inlet manifold comprising a plurality of aligned first openings formed in each of said plurality of fuel cells for directing a fuel supply stream to each of said plurality of anode flow field plates; and
   (f) a fuel outlet manifold comprising a plurality of aligned second openings formed in each of said plurality of fuel cells for discharging a fuel exhaust stream from each of said plurality of anode flow field plates.

12. The proton exchange membrane fuel cell power module of claim 3 wherein said fuel cell stack is hexagonal.

13. The proton exchange membrane fuel cell power module of claim 12, wherein said plenum serves as an oxidant supply manifold, and wherein said air supply is configured to direct air into said plenum and in contact with said water in said reservoir such that said air is humidified and then
   (i) enters said plurality of cathode flow field plates;
   (ii) flows substantially radially through said plurality of cathode flow field plates; and
   (iii) exits said fuel cell stack via a central oxidant exhaust manifold.

14. The proton exchange membrane fuel cell power module of claim 12, wherein said plenum serves as an oxidant supply manifold and is divided by a baffle, and wherein said air supply is configured to direct air into said plenum such that said air
   (i) flows between said interior surface of said cylindrical housing and an outer wall of said baffle in a first substantially axial direction;
   (ii) contacts said water in said reservoir such that said air is humidified;
   (iii) flows between an inner wall of said baffle and said fuel cell stack in a second substantially axial direction, wherein said second substantially axial direction is opposite to said first substantially axial direction;
   (iv) flows substantially radially through said plurality of cathode flow field plates; and
   (v) exits said fuel cell stack via a central oxidant exhaust manifold.

15. The proton exchange membrane fuel cell power module of claim 12, further comprising a layer of diffusive media at least partially submerged in said water in said reservoir.

16. The proton exchange membrane fuel cell power module of claim 13, further comprising a water collection system for recovering water from air flowing in said oxidant exhaust manifold and directing said recovered water to said reservoir.

17. The proton exchange membrane fuel cell power module of claim 12, further comprising:
   (e) a plurality of coolant pathways, each of said pathways disposed between an adjacent pair of said plurality of fuel cells, wherein said coolant pathways are fluidly connected to said reservoir; and
   (f) a coolant circulation system configured to circulate said water from said reservoir through said coolant pathways.

18. The proton exchange membrane fuel cell power module of claim 17, wherein said humidifier further comprises a plurality of nozzles fluidly connected to receive said water exiting said coolant pathways, wherein said coolant circulation system is configured to spray water exiting said coolant pathways into said plenum via said plurality of nozzles to humidify air flowing through said plenum.

19. The proton exchange membrane fuel cell power module of claim 12, wherein at least one of said anode, said anode flow field plate, said cathode and said cathode flow field plate comprises sheet material shaped in the form selected from a group consisting of a triangle, a square, a rectangle, a parallelogram and a half-hexagon, wherein said forms are capable of being fitted together into a substantially hexagonal assembly.

20. The proton exchange membrane fuel cell power module of claim 12, wherein said hexagonal fuel cell stack is formed by a plurality of fuel cell sub-stacks shaped such that when assembled within said cylindrical housing, said fuel cell sub-stacks together constitute said hexagonal fuel cell stack.

* * * * *